US011876745B2

(12) United States Patent
Matsumura et al.

(10) Patent No.: US 11,876,745 B2
(45) Date of Patent: Jan. 16, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Yuichi Kakishima, Palo Alto, CA (US); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/630,782

(22) PCT Filed: Aug. 8, 2019

(86) PCT No.: PCT/JP2019/031489

§ 371 (c)(1),
(2) Date: Jan. 27, 2022

(87) PCT Pub. No.: WO2021/024482

PCT Pub. Date: Feb. 11, 2021

(65) Prior Publication Data

US 2022/0271889 A1 Aug. 25, 2022

(51) Int. Cl.
*H04L 5/00* (2006.01)

(52) U.S. Cl.
CPC .......... *H04L 5/0051* (2013.01); *H04L 5/0042* (2013.01)

(58) Field of Classification Search
CPC ............................ H04L 5/0051; H04L 5/0042
See application file for complete search history.

(56) References Cited

U.S. PATENT DOCUMENTS

| | | | | |
|---|---|---|---|---|
| 10,862,640 | B2 * | 12/2020 | Akula | H04L 5/0087 |
| 2013/0188620 | A1 * | 7/2013 | Dinan | H04W 72/23 370/336 |
| 2015/0078222 | A1 * | 3/2015 | Yang | H04W 72/1268 370/280 |
| 2015/0195063 | A1 | 7/2015 | Ro et al. | |
| 2019/0312704 | A1 | 10/2019 | Rico Alvarino et al. | |
| 2020/0204408 | A1 * | 6/2020 | Chai | H04L 25/0226 |

FOREIGN PATENT DOCUMENTS

| | | | |
|---|---|---|---|
| WO | 2017192232 | A1 | 11/2017 |

OTHER PUBLICATIONS

International Search Report issued in PCT/JP2019/031489 dated Mar. 10, 2020 (1 page).

(Continued)

*Primary Examiner* — Shukri Taha
(74) *Attorney, Agent, or Firm* — Osha Bergman Watanabe & Burton LLP

(57) ABSTRACT

A terminal according to an aspect of the present disclosure includes a control section that reduces a resource to which at least one of an uplink channel and a sounding reference signal (SRS) is mapped, in a case that a first resource provided for the uplink channel overlaps a second resource provided for the SRS, and a transmitting section that performs at least one of a transmission of the uplink channel and a transmission of the SRS. According to an aspect of the present disclosure, in a case that a resource provided for an uplink transmission overlaps a resource provided for an SRS, appropriate processing is performed.

6 Claims, 26 Drawing Sheets

(56) References Cited

OTHER PUBLICATIONS

Written Opinion of the International Searching Authority issued in PCT/JP2019/031489 dated Mar. 10, 2020 (4 pages).
Nokia, Nokia Shanghai Bell; "Discussion on introduction of additional SRS symbols"; 3GPP TSG RAN WG1 Meeting #97, R1-1907072; Reno, USA; May 13-17, 2019 (4 pages).
NTT DOCOMO, Inc .; "Offline summary for AI 7.1.3.3.4 UL data transmission procedure"; 3GPP TSG RAN WG1 Meeting #92, R1-1803295; Athens, Greece; Feb. 26-Mar. 2, 2018 (22 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description, Stage 2 (Release 8)", Mar. 2010 (149 pages).
Extended European Search Report issued in European Application No. 19940723.0, dated Feb. 17, 2023 (8 pages).

* cited by examiner

Comb2
comb offset = 0
comb offset = 1
PRB
PRB
RE
SRS RESOURCE
FREQUENCY
RE USED FOR SRS TRANSMISSION Comb4
comb offset = 0
comb offset = 1
comb offset = 2
comb offset = 3
PRB
PRB
RE
SRS RESOURCE
FREQUENCY

| | | PUCCH | |
|---|---|---|---|
| | | Periodic | Aperiodic |
| SRS | Periodic | PUCCH | PUCCH |
| | Semi-persistent | SRS | PUCCH |
| | Aperiodic | SRS | PUCCH |

FIG. 4

CASE THAT PUSCH RESOURCE IN RETRANSMISSION OVERLAPS SRS #2 RESOURCE

OVERLAP BETWEEN PUSCH RESOURCE IN INITIAL TRANSMISSION AND SRS #1 RESOURCE

RE WHERE ZP-SRS IS MAPPED

・ Comb2
comb offset = 0
comb offset = 1
PRB
PRB
RE
FREQUENCY

・ Comb4
comb offset = 0
comb offset = 1
comb offset = 2
comb offset = 3
PRB
PRB
RE
FREQUENCY ・ Comb0
PRB
PRB
RE
FREQUENCY

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (e.g., LTE Rel. 8 to Rel. 14), a user terminal (User Equipment (UE)) transmits uplink signals. The uplink signals may include, for example, at least one of a random access channel (Physical Random Access Channel (PRACH)), an uplink shared channel (Physical Uplink Shared Channel (PUSCH)), an uplink control channel (Physical Uplink Control Channel (PUCCH)), a sounding reference signal (SRS), and a demodulation reference signal (DM-RS) for a PUSCH or a PUCCH.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (e.g., NR), the UE performs uplink transmission (e.g., PUCCH, PUCCH, SRS, and the like).

However, operations of a terminal in a case that time and frequency resources provided for an uplink transmission overlap time and frequency resources provided for an SRS are not clarified. If the terminal cannot perform appropriate processing in such a case, system performance is likely to deteriorate.

As such, the present disclosure has an object to provide a terminal and a radio communication method for performing appropriate processing in a case that a resource provided for uplink transmission overlaps a resource provided for an SRS.

Solution to Problem

A terminal according to an aspect of the present disclosure includes a control section that reduces a resource to which at least one of an uplink channel and a sounding reference signal (SRS) is mapped, in a case that a first resource provided for the uplink channel overlaps a second resource provided for the SRS, and a transmitting section that performs at least one of a transmission of the uplink channel and a transmission of the SRS.

Advantageous Effects of Invention

According to an aspect of the present disclosure, in a case that a resource provided for an uplink transmission overlaps a resource provided for an SRS, appropriate processing is performed.

BRIEF DESCRIPTION OF DRAWINGS

FIG. 4 is a diagram to show an example of transmission priority based on a type of uplink transmission;

DESCRIPTION OF EMBODIMENTS (SRS)

Figures 1A, 1B:
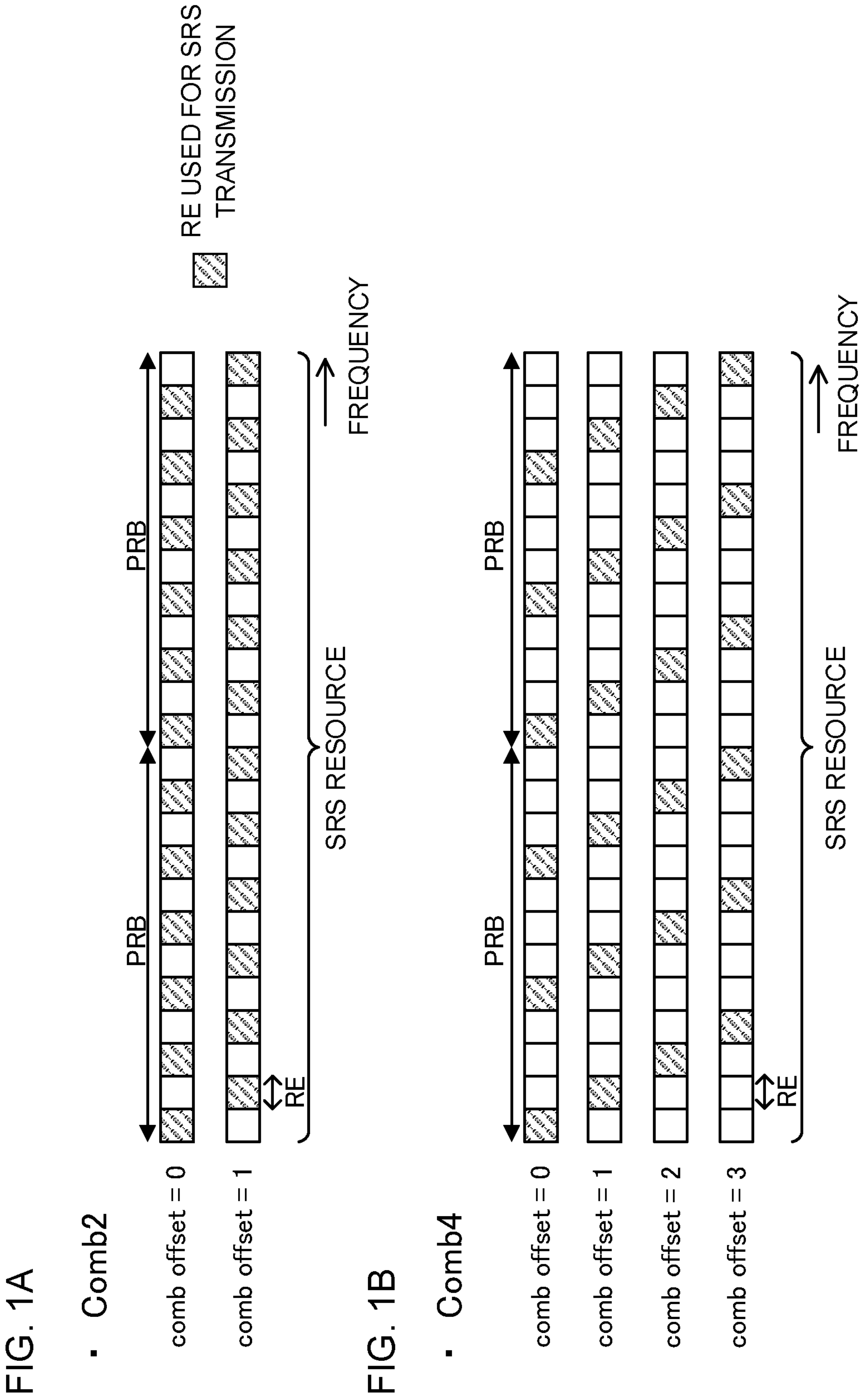
FIGS. 1A and 1B are diagrams to show examples of a Comb structure for an SRS.

In NR, usage of a measurement reference signal (sounding reference signal (SRS)) is broad. The SRS in NR is used not only for UL channel state information (CSI) measurement that is also used in exiting LTE (LTE Rel. 8 to Rel. 14), but also for DL CSI measurement, beam management, and the like.

A UE may be configured with one or more SRS resources. The SRS resource may be identified by an SRS resource indicator (SRI).

Each of SRS-resource information elements (IEs) may include the number of SRS ports (antenna ports) (may correspond to one or a plurality of SRS ports). For example, the number of antenna ports may be 1, 2, or 4.

Each SRS resource IE may include the number of OFDM symbols. For example, the number of OFDM symbols may be 1, 2, or 4.

Each SRS resource IE may include a time-domain starting position $l_0$.

Each SRS resource IE may include a frequency-domain starting position $k_0$.

The UE may be configured with one or a plurality of SRS resource sets. One SRS resource set may be associated with the certain number of SRS resources. The UE may use higher layer parameters common to the SRS resources included in one SRS resource set. Note that in the present disclosure, the resource set may be interpreted as a resource group, simply a group, or the like.

At least one of the SRS resource set and the SRS resource related information may be configured for the UE using higher layer signaling, physical layer signaling, or a combination of these.

For example, higher layer signaling may be any one or combinations of RRC (Radio Resource Control) signaling, medium access control (MAC) signaling, broadcast information, and the like.

For example, MAC signaling may use MAC control elements (CEs), MAC Protocol Data Units (PDUs), and the like. The broadcast information may be, for example, master information block (MIB), system information block (SIB), minimum system information (Remaining Minimum System Information (RMSI)), other system information (OSI), and the like.

For example, physical layer signaling may be downlink control information (DCI).

SRS configuration information (e.g., "SRS-Config" of RRC parameters (information elements)) may include SRS resource set configuration information, SRS resource configuration information, and the like.

The SRS resource set configuration information (e.g., "SRS-ResourceSet" of the RRC parameters) may include an SRS resource set ID (Identifier) (SRS-ResourceSetId), a list of SRS resource ID (SRS-ResourceId) used in the resource set, an SRS resource type, and SRS usage information.

Here, the SRS resource type may indicate any one of a periodic SRS (P-SRS), a semi-persistent SRS (SP-SRS), and an aperiodic SRS (aperiodic SRS (A-SRS, AP-SPS)). Note that the UE may periodically (or after activation, periodically) transmit a P-SRS and a SP-SRS, and transmit an A-SRS, based on an SRS request in the DCI.

The SRS usage ("usage" of the RRC parameters, "SRS-SetUse" of L1 (Layer-1) parameters) may be, for example, beam management (beamManagement), codebook (CB), noncodebook (NCB), antenna switching, and the like. An SRS for codebook or noncodebook usage may be used to determine codebook based or noncodebook based PUSCH transmission precoder based on the SRI.

For an SRS for beam management usage, it may be expected that only one SRS resource for each SRS resource set can be transmitted at a certain time instant. Note that in a case that the plurality of SRS resources belong to respective different SRS resource sets, these SRS resources may be simultaneously transmitted.

For example, the UE, in a case of the codebook based transmission, may determine the precoder for PUSCH transmission, based on the SRI, a transmitted rank indicator (TRI), and a transmitted precoding matrix indicator (TPMI). The UE, in a case of the noncodebook based transmission, may determine the precoder for PUSCH transmission, based on the SRI.

The SRS resource configuration information (e.g., "SRS-Resource" of the RRC parameters) may include an SRS resource ID (SRS-ResourceId), the number of SRS ports, an SRS port number, a transmission Comb, SRS resource mapping (e.g., at least one of time and frequency resource positions, resource offset, resource period, the number of repetitions, the number of SRS symbols, SRS bandwidth, and the like), hopping-related information, an SRS resource type, a sequence ID, space-related information, and the like.

The UE may transmit the SRS in adjacent symbols, the number of which is the number of SRS symbols, of the last six symbols in one slot. Note that the number of SRS symbols may be 1, 2, 4, or the like.

The UE may switch a BWP (Bandwidth Part) or antenna for transmitting an SRS for each slot. The UE may apply at least one of intra-slot hopping and inter-slot hopping to the SRS transmission.

The SRS sequence may be a low peak-to-average power ratio (PAPR) sequence. The number of transmission Combs $K_{TC}$ may be included in the higher layer parameters (e.g., transmissionComb).

The low PAPR sequence may be a Constant Amplitude Zero Auto Correlation (CAZAC) sequence, or a sequence complying with a CAZAC sequence (e.g., computer generated sequence (CGS)). The CGS may be defined by the specifications (e.g., table).

As the SRS transmission Comb, an IFDMA (Interleaved Frequency Division Multiple Access) may be applied in which Comb 2 (SRS of one RE is mapped every two resource elements (REs, subcarriers)) or Comb 4 (SRS of one RE is mapped every four REs), and cyclic shift (CS) are used.

In a Comb structure of Comb value=n, a value of a Comb offset may be any of integers 0 to n−1. In a structure of Comb (Comb value=2), Comb offset may take any value of 0 and 1 (Comb offset={0,1}). FIG. 1A illustrates each of the cases of Comb offset={0,1}. In a structure of Comb 4 (Comb value=4), Comb offset={0,1,2,3} holds. FIG. 1B illustrates the case of Comb offset={0,1,2,3}.

In the present disclosure, the Comb offset, a Comb index, and a transmission Comb offset may be interchangeably interpreted.

As for the CS, in the case of Comb 2, a cyclic shift (CS) number (CS index) $n_{SRS}^{cs,i}$ for an antenna port $p_i$ may be any value in a set of {0,1,2,3,4,5,6,7}. In the case of Comb 4, the CS number $n_{SRS}^{cs,i}$ for the antenna port $p_i$ may be any value in a set of {0,1,2,3,4,5,6,7,8,9,10,11}. A value $\alpha_i$ of the CS for the antenna port $p_i$ is given as $2\pi n_{SRS}^{cs,i}/n_{SRS}^{cs,max}$ using the CS number $n_{SRS}^{cs,i}$ and a maximum number $n_{SRS}^{cs,max}=12$ of the CS number. In the case of using Comb 2 and the CS, the UEs the maximum number of which is 2×8=16 can be multiplexed. In the case of using Comb 4 and the CS, the UEs the maximum number of which is 4×12=48 can be multiplexed. A plurality of CSs may be configured for the different UEs, or may be associated with the different SRS ports.

(Overlapping of UL Transmission Resources)

In Rel.15, an RE corresponding to the PUSCH in a PRB corresponding to the PUSCH is not used for a DMRS associated with the PUSCH, a PTRS, or a DMRS for other co-scheduled UEs. The DMRS for other co-scheduled UEs may be a DMRS mapped in a comb different from a comb in which a DMRS associated with the PUSCH is mapped.

In Rel.15, in a case that for an SRS and a PUCCH on the same carrier, either a periodic (P)-SRS or a semi-persistent (SP)-SRS, and a PUCCH carrying either only channel state information (CSI) or only reference signal received power in layer 1 (L1-RSRP (Layer 1-Reference Signal Received Power)) are configured in the same symbol, the UE does not transmit the SRS. In a case that a P-SRS or SP-SRS transmission is configured in a symbol the same as that for a PUCCH carrying an HARQ-ACK (Hybrid Automatic Repeat reQuest ACKnowledgement) or a scheduling request (SR), or in a case that an aperiodic (A)-SRS transmission is triggered, the UE does not transmit the SRS. In a case that that overlapping the PUCCH causes the SRS not to be transmitted, only the SRS symbol overlapping the PUCCH is dropped. In a case that transmission of an A-SRS overlapping, in the same symbol a PUCCH carrying only SP- or P-CSI reporting, or SP- or P-L1-RSRP reporting is triggered, the PUCCH is not transmitted.

On the other hand, in a case that an A-SRS overlaps a PUCCH for semi-persistent CSI reporting or periodic CSI reporting, the UE does not transmit the PUCCH.

In 3GPP Rel. 15, simultaneous transmission of an SRS and an UL channel (PUSCH or PUCCH) is not permitted in intra-band carrier aggregation and inter-band carrier aggregation. The UE does not expect to be configured with an SRS from one carrier, and a PUSCH, UL DM-RS, UL PT-RS, or PUCCH format from a different carrier in the same symbol.

However, UE operations in a case that the configured SRS resource overlaps the scheduled or configured PUSCH are not clear. Additionally, the UE operations in the case that the configured SRS resource overlaps the scheduled or configured PUCCH are not sufficiently studied.

Figure 2:
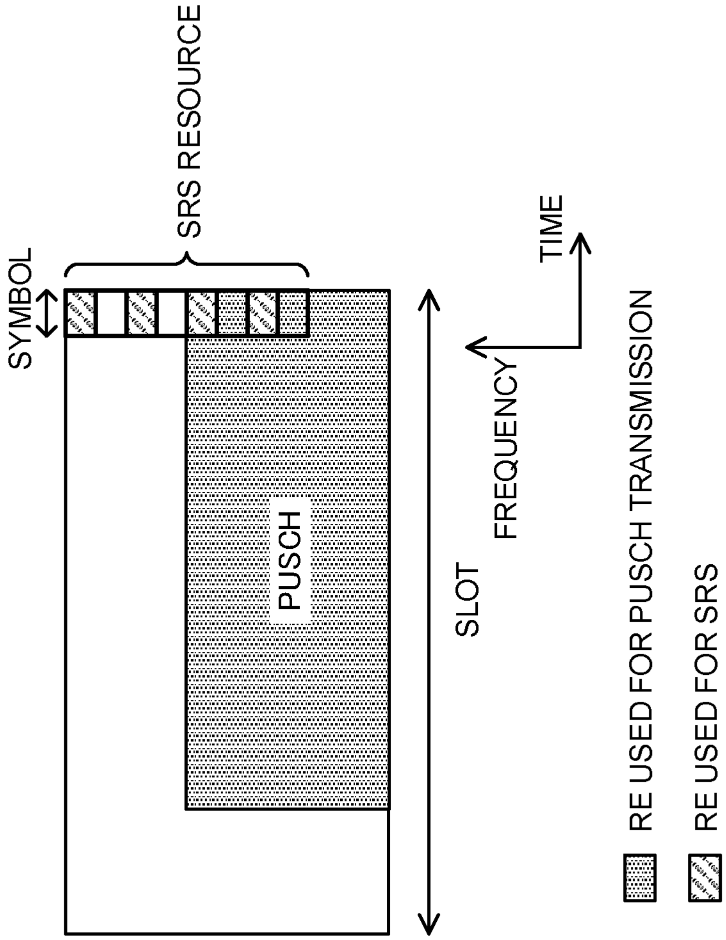
FIG. 2 is a diagram to show an example of a case that a resource for an uplink channel overlaps a resource for an SRS.

A case that a configured SRS resource overlaps a scheduled or configured UL channel resource is described. In the examples in FIG. 2, the configured SRS resource of Comb 2 overlaps the last symbol for the scheduled PUSCH. Since processing in such a case is not defined in Rel. 15, the UE operations are not clear.

On the other hand, it is studied that the SRS uses frequency hopping or Comb, that the PUSCH is mapped over multiple slots, and so on. In a case that the UL transmission uses complex resources like this, if a base station schedules a PUSCH such that an SRS does not overlap the PUSCH, scheduling flexibility is reduced and a load on the base station is increased.

If the UE cannot appropriately process the UL channel and the SRS in such a case, the system performance may deteriorate.

As such, the inventors of the present invention came up with the idea of a method for appropriately processing a UL channel and an SRS in a case that a resource for the UL channel overlaps a resource for the SRS.

Hereinafter, embodiments according to the present disclosure will be described in detail with reference to the drawings. The radio communication method according to each embodiment may be employed independently or may be employed in combination.

(Radio Communication Method)

In the present disclosure, UL transmission, SRS, PUSCH, PUCCH, and UCI may be interchangeably interpreted.

In the present disclosure, UL channel, PUSCH, PUCCH, and UCI may be interchangeably interpreted.

In the present disclosure, slot, sub-slot, mini-slot, subframe, period, and time field may be interchangeably interpreted.

In the present disclosure, not performing UL transmission, dropping UL transmission, canceling UL transmission, not transmitting the whole of UL transmission, and using none of resource configured or scheduled for UL transmission may be interchangeably interpreted.

In the present disclosure, transmitting part of UL transmission, puncturing UL transmission, rate-matching UL transmission, mapping UL transmission to some of resources configured or scheduled for the UL transmission, and not mapping UL transmission to some of resources configured or scheduled for the UL transmission may be interchangeably interpreted. In the present disclosure, puncturing or rate-matching UL transmission in a specific resource, puncturing or rate-matching UL transmission around a specific resource, not mapping UL transmission in a specific resource, and not mapping UL transmission to a specific resource of resources configured for UL transmission may be interchangeably interpreted.

In the present disclosure, UL channel resource, resource provided for UL channel, resource configured, scheduled, or triggered for a UL channel, ranges of time and frequency resources for a UL channel, and resource element (RE) for a UL channel may be interchangeably interpreted. In the present disclosure, SRS resource, resource provided for an SRS, resource configured or scheduled or triggered for an SRS, ranges of time and frequency resources for an SRS, and RE for an SRS may be interchangeably interpreted. In the present disclosure, UL transmission resource, resource provided for UL transmission, resource configured, scheduled, or triggered for UL transmission, ranges of time and frequency resources for UL transmission, and RE for UL transmission may be interchangeably interpreted.

In the present disclosure, resource configured for SRS (e.g., NZP-SRS or ZP-SRS), SRS resource range, entire bandwidth of SRS resource, all REs in ranges of time and frequency for SRS resource, and REs based on all Comb offsets may be interchangeably interpreted.

In the present disclosure, arrangement, position, allocation, mapping, pattern, positions in a slot and in a PRB, and symbol position and subcarrier position may be interchangeably interpreted.

In the present disclosure, kind of UL transmission, type of UL transmission, and content of UL transmission may be interchangeably interpreted.

The embodiments may be applied to PUSCH and SRS overlapping, or PUCCH and SRS overlapping.

Embodiment 1

In the case that the resource for an SRS overlaps a resource for a UL channel, the UE may not transmit part or the whole of the SRS or the UL channel (or may reduce the resource for either the SRS or the UL channel).

Embodiment 1-1

Figure 3B:
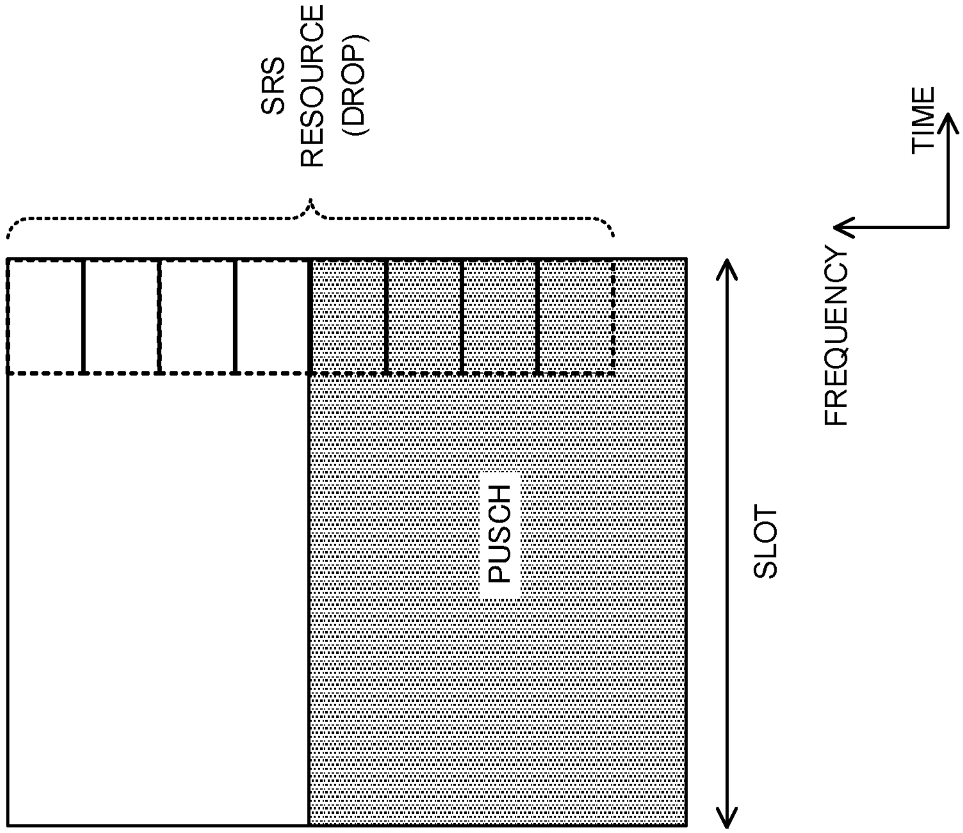
FIG. 3A and FIG. 3B are diagrams to show examples of a control method of a resource for an uplink channel and a resource for an SRS.
Figure 3A:
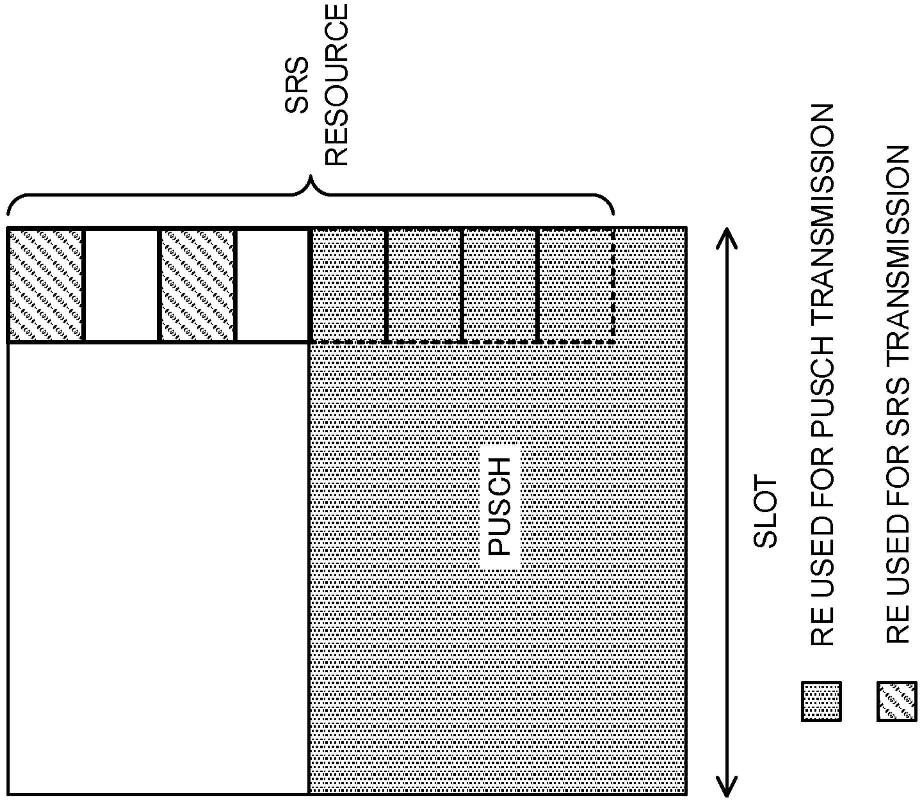

As shown in FIGS. 3A and 3B, in a case that the resource for the SRS overlaps the resource for the UL channel (e.g., PUSCH), the UE may not transmit part or the whole of the SRS (reduce the resource for the SRS) and may transmit the UL channel. For example, the UE may puncture the SRS not to transmit a portion of the SRS overlapping the resource for the UL channel (e.g., PUSCH) (FIG. 3A), or may drop the SRS overlapping the resource for the UL channel (e.g., PUSCH) (FIG. 3B). In this case, transmission of the UL channel dynamically scheduled can be ensured on a priority basis, and throughput reduction can be suppressed.

In a case that the UE punctures the SRS, the UE may (1) generate a transmission signal sequence before being dropped, and then, puncture an overlap portion of the SRS and the UL channel, or (2) may generate a transmission signal sequence of the SRS in a length of the transmission signal sequence after being dropped. The UE may switch and employ (1) or (2) via a notification from a network (e.g., a base station).

In the case that the resource for the SRS overlaps the resource for the UL channel, the UE may not transmit part or the whole of the UL channel and may transmit the SRS. For example, the UE may rate-match or puncture the UL channel not to transmit a portion of the UL channel overlapping the resource for the SRS, or may drop the UL channel. Here, the UE may rate-match or puncture the UL channel in accordance with Embodiment 2. In this case, at least one of throughput increase and quality improvement by SRS measurement is enabled.

In the case that the resource for the aperiodic (A)-SRS overlaps the resource for the UL channel, the UE may not transmit part or the whole of the UL channel and may transmit the A-SRS. For example, the UE may rate-match or puncture the UL channel not to transmit a portion of the UL channel overlapping the resource for the A-SRS, or to drop the UL channel. Here, the UE may rate-match or puncture the UL channel in accordance with Embodiment 2. In this case, transmission of the A-SRS dynamically scheduled can be ensured on a priority basis, and at least one of throughput increase and quality improvement by SRS measurement is enabled.

Embodiment 1-2

In the case that the resource for the SRS overlaps the resource for the UL channel, the UE may determine which of the UL transmissions of the SRS and the UL channel is transmitted on a priority basis, based on at least one of prioritized UL transmission determination methods 1 to 5 below.

[Prioritized UL Transmission Determination Method 1]

The UE may determine the prioritized UL transmission, based on an order of reception or detection of the downlink control information (DCI) scheduling or triggering the SRS and the DCI scheduling or triggering the UL channel.

The UE may determine to prioritize which of the SRS and the UL channel scheduled or triggered by the DCI earlier received or detected of the DCI scheduling or triggering the SRS and the DCI scheduling or triggering the UL channel.

For example, in a case that the DCI scheduling or triggering the A-SRS is detected earlier than the DCI scheduling or triggering the UL channel, and the resource for the A-SRS overlaps the resource for the UL channel, the UE may determine to prioritize the SRS. In this case, the UE may rate-match or puncture the UL channel in a portion of the UL channel overlapping the SRS resource to transmit the UL channel and the SRS. Here, the UE may rate-match or puncture the UL channel in accordance with at least one of Embodiments 2-1 to 2-6 described later. In this case, the UE may drop the UL channel and transmit the SRS. For example, in a case the DCI scheduling or triggering the A-SRS is detected later than the DCI scheduling or triggering the UL channel, and the resource for the A-SRS overlaps the resource for the UL channel, the UE may determine to prioritize the UL channel. In this case, the UE may drop the A-SRS and transmit the UL channel. In these cases, since at the time when the UE receives the earlier DCI, the UE performs processing on the UL transmission corresponding to that DCI, and hence, the processing on the UL transmission can be prevented from being canceled by reception of subsequent DCI.

The UE may determine to prioritize which of the SRS and the UL channel scheduled or triggered by the DCI later received or detected of the DCI scheduling or triggering the SRS and the DCI scheduling or triggering the UL channel. For example, in a case that the DCI scheduling or triggering the A-SRS is detected later than the DCI scheduling or triggering the UL channel, and the resource for the A-SRS overlaps the resource for the UL channel, the UE may determine to prioritize the SRS. In this case, the UE may rate-match or puncture the UL channel in a portion of the UL channel overlapping the SRS resource to transmit the PUSCH and the SRS. Here, the UE may rate-match or puncture the UL channel in accordance with at least one of Embodiments 2-1 to 2-6 described later. In this case, the UE may drop the UL channel and transmit the SRS. For example, in a case that the DCI scheduling or triggering the A-SRS is detected earlier than the DCI scheduling or triggering the UL channel, and the resource for the A-SRS overlaps the resource for the PUSCH, the UE may determine to prioritize the UL channel. In this case, the UE may drop the A-SRS and transmit the UL channel. In these cases, the UE can consider that UL transmission later scheduled or triggered is more important than the UL transmission earlier scheduled or triggered, to cancel the processing on the UL transmission earlier scheduled or triggered, and prioritize the more important UL transmission to perform the processing on the UL transmission.

[Prioritized UL Transmission Determination Method 2]

In a case that the resources of the SRS or the UL channel overlap each other, the UE may determine to prioritize which of the UL transmissions of the SRS and the UL channel, based on a type of a search space (e.g., common search space (CSS), UE-specific search space (USS)) used to detect the DCI scheduling or triggering at least one of the SRS and the UL channel.

For example, the UE may transmit, on a priority basis, the UL transmission scheduled or triggered by the DCI that is detected in the CSS. For example, the UE may transmit, on a priority basis, the SRS or the UL channel scheduled or triggered by the DCI that is detected in the USS.

[Prioritized UL Transmission Determination Method 3]

In the case that the resources of the SRS or the UL channel overlap each other, the UE may determine to prioritize which of the UL transmissions of the SRS and the UL channel, based on a cell or an index of a CC used to detect the DCI scheduling or triggering at least one of the SRS and the UL channel.

The UE may transmit, on a priority basis, at least either the SRS or the UL channel scheduled or triggered by the DCI that is detected in a cell or primary cell (PCell) having a smaller component carrier (CC, serving cell) index. The UE may transmit, on a priority basis, at least either the SRS or the UL channel scheduled or triggered by the DCI that is detected in a cell having a larger CC index.

[Prioritized UL Transmission Determination Method 4]

In the case that the resource for the SRS overlaps the resource for the UL channel, the UE may determine to prioritize which of the UL transmissions of the SRS and the UL channel, based on a type of each of the SRS and the UL channel.

The type of the UL transmission may be defined based on at least one of any one of periodic (P), semi-persistent (SP), and aperiodic (A) transmission timings, and content carried on the UL channel. The type of the SRS may be any one of P-SRS, SP-SRS, and A-SRS. The type of the PUCCH may be any one of a PUCCH periodically transmitted (periodic PUCCH) such as P-CSI reporting, a PUCCH semi-persistently transmitted (semi-persistent PUCCH) such as SP-CSI reporting and HARQ-ACK for DL-semi-persistent (SPS) transmission, and a PUCCH aperiodically transmitted (aperiodic PUCCH) such as SR, HARQ-ACK, and A-CSI reporting. The type of the PUSCH may be any one of a PUSCH periodically transmitted (periodic PUSCH) such as a type 1 configured grant PUSCH, a PUSCH semi-persistently transmitted (semi-persistent PUSCH) such as a type 2 configured grant PUSCH, and a PUSCH aperiodically transmitted (aperiodic PUSCH) such as a dynamic grant PUSCH. The content carried on the UL channel may be a UCI type (SR, HARQ-ACK, CSI (e.g., P-CSI reporting, SP-CSI reporting, A-CSI reporting)). The UCI may be carried on the PUCCH or the PUSCH.

As shown in FIG. 4, which of the UL transmissions is prioritized may be defined based on the type of the SRS and the type of the PUCCH. For example, in a case that the resource for the A-SRS overlaps the resource for the aperiodic PUCCH, the UE may prioritize the aperiodic PUCCH (or may drop, puncture, or rate-match the aperiodic PUCCH to transmit the whole A-SRS). For example, in a case that the resource for the A-SRS overlaps the resource for the periodic PUCCH, the UE may prioritize the A-SRS (or may drop or puncture the periodic PUCCH to transmit the whole A-SRS). For example, in a case that the resource for the P-SRS overlaps the resource for the periodic PUCCH, the UE may prioritize the periodic PUCCH (or may drop or puncture the P-SRS to transmit the whole periodic PUCCH).

Priorities for the type of the SRS and the type of the UL channel (such as PUCCH, UCI, and PUSCH) may be defined. The UE may prioritize the UL transmission having a smaller value of the priority (priority order), or prioritize the UL transmission having a larger value of the priority.

The priority may be given in the order of aperiodic UL transmission, semi-persistent UL transmission, and periodic UL transmission. Next, the PUCCH may be prioritized in a case that the types of the SRS and the PUCCH are the same. For example, the priorities 1 to 6 may be associated with aperiodic PUCCH, A-SRS, semi-persistent PUCCH, SP-SRS, periodic PUCCH, and P-SRS, respectively, and the UE may prioritize the UL transmission having a smaller value of the priority. For example, in a case that the aperiodic PUCCH overlaps the A-SRS, the UE may prioritize the A-SRS having a smaller value of the priority (or may drop, puncture, or rate-match the aperiodic PUCCH to transmit the whole A-SRS).

The priority may be given in the order of periodic UL transmission, semi-persistent UL transmission, and aperiodic UL transmission.

The PUCCH or the UCI may be prioritized. For example, the priorities 1 to 6 may be associated with aperiodic PUCCH, semi-persistent PUCCH, periodic PUCCH, A-SRS, SP-SRS, and P-SRS, respectively, and the UE may prioritize the UL transmission having a smaller value of the priority (priority order). For example, in the case that the aperiodic PUCCH overlaps the A-SRS, the UE may prioritize the aperiodic PUCCH having a smaller value of the priority (or may drop or puncture the A-SRS to transmit the whole aperiodic PUCCH).

[Prioritized UL Transmission Determination Method 5]

In the case that the resource for the SRS overlaps the resource for the UL channel, the UE may determine to transmit, on a priority basis, either the SRS or the UL channel, based on indexes (index relationship) related to the respective resources for the SRS and the UL channel.

For example, the UE may determine to transmit, on a priority basis, at least either the SRS or the UL channel having a smaller time index of the resource for the SRS and the resource for the UL channel. For example, the UE may determine to transmit, on a priority basis, at least either the SRS or the UL channel having a larger time index of the transmission resource for the SRS and the transmission resource for the PUSCH. The time index may be an index of a start or end time resource for the UL transmission. The time resource may be any one of a symbol, a mini-slot, a sub-slot, and a slot.

For example, the UE may determine to transmit, on a priority basis, at least either the SRS or the UL channel having a smaller frequency index of the resource for the SRS and the resource for the PUSCH. For example, the UE may determine to transmit, on a priority basis, at least either the SRS or the UL channel having a larger frequency index of the transmission resource for the SRS and the transmission resource for the PUSCH. The frequency index may be an index of a lowest (start) or highest (end) frequency resource for the UL transmission. The frequency resource may be any one of a subcarrier spacing, a resource element (RE), a resource block (RB), a CC, a cell, and a band.

According to Embodiment 1, in the case that the SRS resource overlaps the UL channel resource, not transmitting part or the whole of either the SRS or the UL channel allows the other to be appropriately transmitted. In addition, which is prioritized, the SRS or the UL channel, can be appropriately determined.

Embodiment 2

In the case that the resource for the SRS overlaps the resource for the UL channel, the UE may rate-match (or puncture) the UL channel (or reduce the UL channel resource) to transmit the SRS and the UL channel.

In the case that the resource for the SRS overlaps the resource for the UL channel, the UE may rate-match (or puncture) the UL channel in accordance with at least one of Embodiments 2-1 to 2-6 described later.

Embodiment 2-1

In the case that the resource for the SRS overlaps the resource for the UL channel, the UE may not use the RE used to transmit the SRS, for transmitting the UL channel and the demodulation reference signal (DMRS) for the UL channel, and may rate-match (or puncture) the UL channel in the RE used to transmit the SRS. In a case that the SRS resource having the Comb structure is configured for the UE, the RE used to transmit the SRS is only an RE to which the SRS sequence is mapped.

Figures 5A, 5B, 5C:
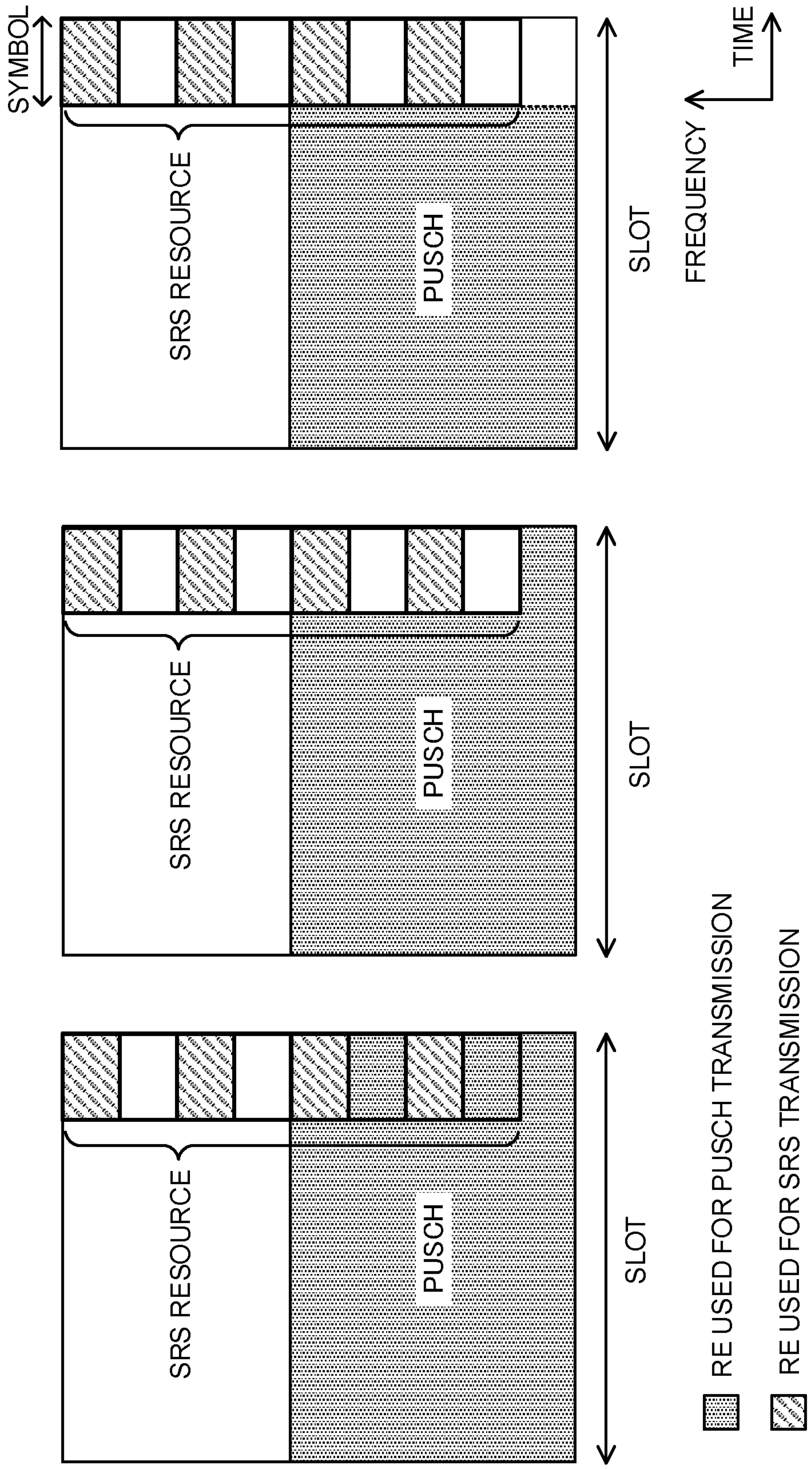
FIGS. 5A to 5C are diagrams to show examples of a control method of a resource for an uplink channel and a resource for an SRS.

For example, in FIG. 5A, the configured SRS of Comb 2 overlaps the last symbol for the scheduled PUSCH. In this case, the UE rate-matches (or punctures) the PUSCH in the RE used to transmit the SRS, to transmit the SRS and the PUSCH.

In this case, the transmission can be efficiently performed while minimizing increase in coding rate for the UL channel to suppress reduction in communication quality, and thus, the throughput of the UL channel can be improved.

Embodiment 2-2

In the case that the resource for the SRS overlaps the resource for the UL channel, the UE may not use the resource configured for the SRS (SRS resource range), for transmitting the UL channel and the DMRS for the UL channel, and may rate-match (or puncture) the UL channel in the resource configured for the SRS. In the case that the SRS resource having the Comb structure is configured for the UE, the SRS resource range includes not only the RE used for the transmission based on the value of the configured Comb offset, but also the RE used for transmissions based on other values of the Comb offset.

For example, in an example shown in FIG. 5B, the scheduled PUSCH resource and the configured SRS resource are the same as those in FIG. 5A. In this case, the UE rate-matches (or punctures) the PUSCH in the SRS resource range to transmit the SRS and the PUSCH.

Figure 6:
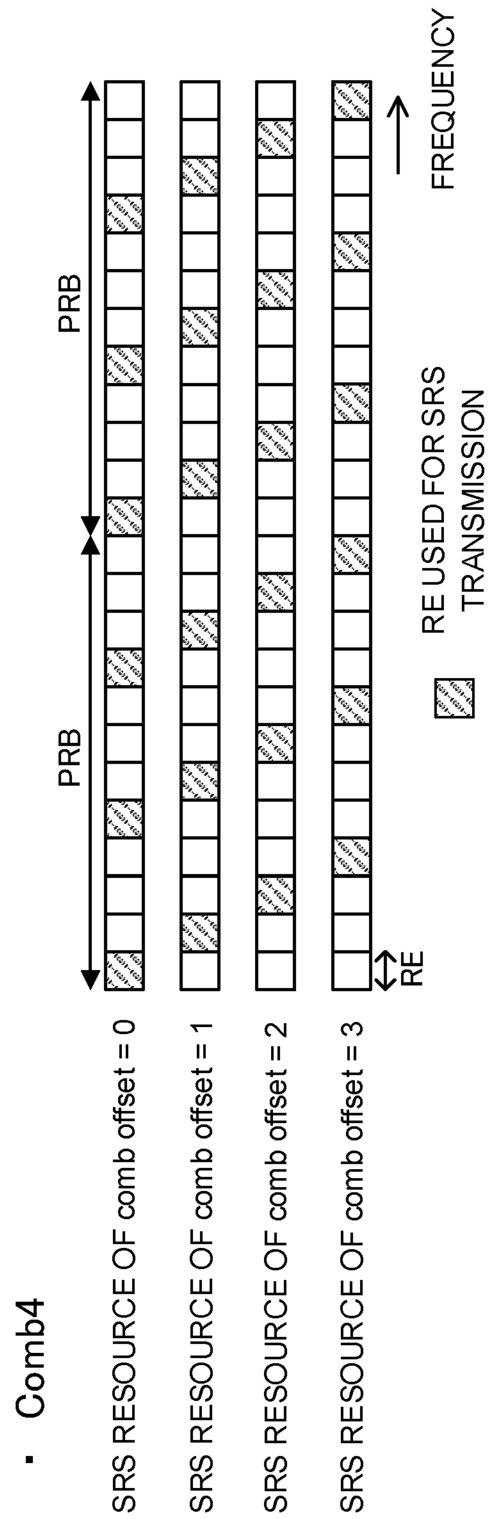
FIG. 6 is a diagram to show a Comb structure for an SRS.

In a case that the SRS resource of Comb 4 is configured, the SRS resource range includes, as show in FIG. 6, all REs used for the transmission with Comb offset=0 to 3 (that is, the REs likely to be used for SRS transmission of the UE configured with the Comb offset and SRS transmission of another UE).

The resource, of the SRS resource, not mapped to the UL channel by the rate matching or puncturing in accordance with Embodiment 2-2 described above may be used for the SRS of another UE (e.g., the SRS having a different Comb offset). Therefore, by use of Embodiment 2-2, even in a case that the SRSs of a plurality of UEs are multiplexed by the Comb, the UL channel of the UE can be prevented from colliding or interfering with the SRS of another UE.

Embodiment 2-3

In the case that the resource for the SRS overlaps the resource for the UL channel, the UE may not use the symbol for the SRS for transmitting the UL channel and the DMRS for the UL channel, and may rate-match (or puncture) the UL channel in the symbol for the SRS (all REs in the symbol for the SRS).

For example, in an example shown in FIG. 5C, the scheduled PUSCH resource and the configured SRS resource are the same as those in FIG. 5A. In this case, the UE rate-matches (or punctures) the PUSCH in the symbol (period) where the SRS is configured, to transmit the SRS and the PUSCH.

In this case, in a symbol for an SRS overlapping a UL channel of a UE, an SRS having a different length (bandwidth) may be transmitted by another UE. The UL channel being not mapped to the symbol for the SRS can prevent the UL channel of the UE from colliding or interfering with the SRS of another UE.

<<SRS Frequency Hopping>>

Even in a case that the SRS with frequency hopping is configured, the UE may rate-match or puncture the UL channel in accordance with at least one of Embodiments 2-1 to 2-3 described later.

In the case that the SRS with frequency hopping is configured and the resource for the SRS overlaps the resource for the UL channel, the UE may not use the RE used to transmit the SRS, for transmitting the UL channel and the demodulation reference signal (DMRS) for the UL channel, and may rate-match (or puncture) the UL channel in the RE used to transmit the SRS. Specifically, the UE may rate-match or puncture the UL channel, based on the method according to Embodiment 2-1 described above.

Figure 7A:
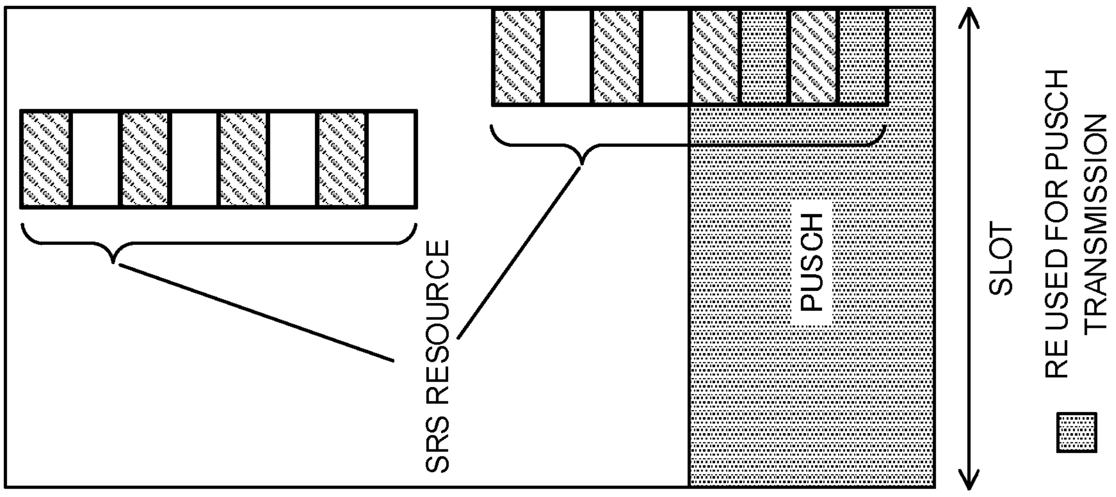
FIGS. 7A to 7C are diagrams to show examples of a control method of a resource for an uplink channel and a resource for an SRS.

In FIG. 7A, an SRS resource of a first hop (before the frequency hopping) and an SRS resource of a second hop (after the frequency hopping) are allocated in a slot the same as the PUSCH resource, and the SRS resource of the second hop overlaps the PUSCH resource in the last symbol for the PUSCH resource. In this case, the UE rate-matches (or punctures) the PUSCH in the RE used to transmit the SRS, to transmit the SRS and the PUSCH.

In the case that the SRS with frequency hopping is configured and the resource for the SRS overlaps the resource for the UL channel, the UE may not use the resource configured for the SRS (SRS resource range), for transmitting the UL channel and the DMRS for the UL channel, and may rate-match (or puncture) the UL channel in the resource configured for the SRS. Specifically, the UE may rate-match or puncture the UL channel, based on the method according to Embodiment 2-2 described above. In the case that the SRS resource having the Comb structure is configured for the UE, the resource configured for the SRS includes not only the RE used for the transmission based on the value of the configured Comb offset, but also the REs used for transmission based on other values of the Comb offset.

Figure 7B:
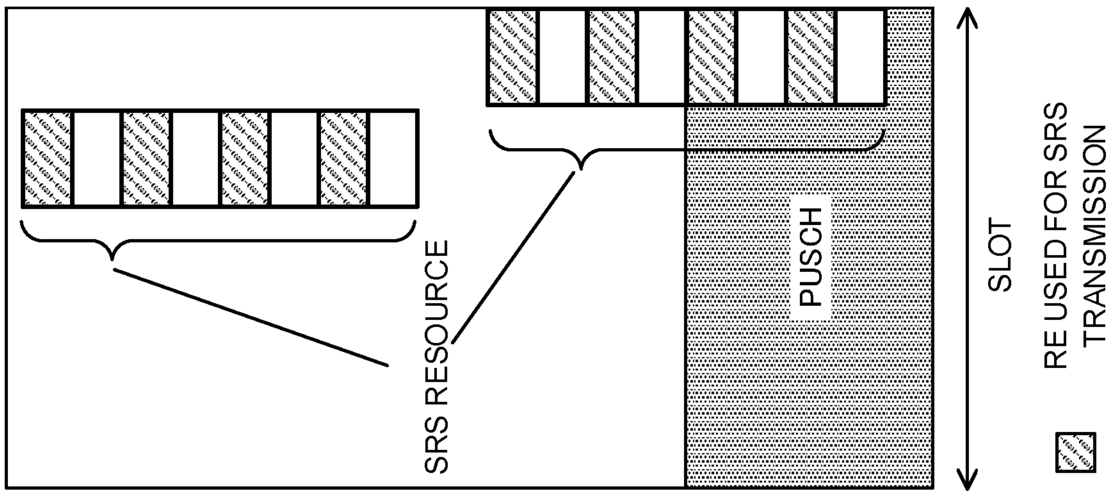

In an example shown in FIG. 7B, the scheduled PUSCH resource and the configured SRS resource are the same as those in FIG. 7A. In this case, the UE rate-matches (or punctures) the PUSCH in the SRS resource range to transmit the SRS and the PUSCH.

In the case that the SRS with frequency hopping is configured and the resource for the SRS overlaps the resource for the UL channel, the UE may not use the symbol for the SRS, for transmitting the UL channel and the DMRS for the UL channel, and may rate-match (or puncture) the UL channel in the symbol for the SRS overlapping the resource for the UL channel (all REs in the SRS symbol). Specifically, the UE may rate-match or puncture the UL channel, based on the method according to Embodiment 2-3 described above.

Figure 7C:
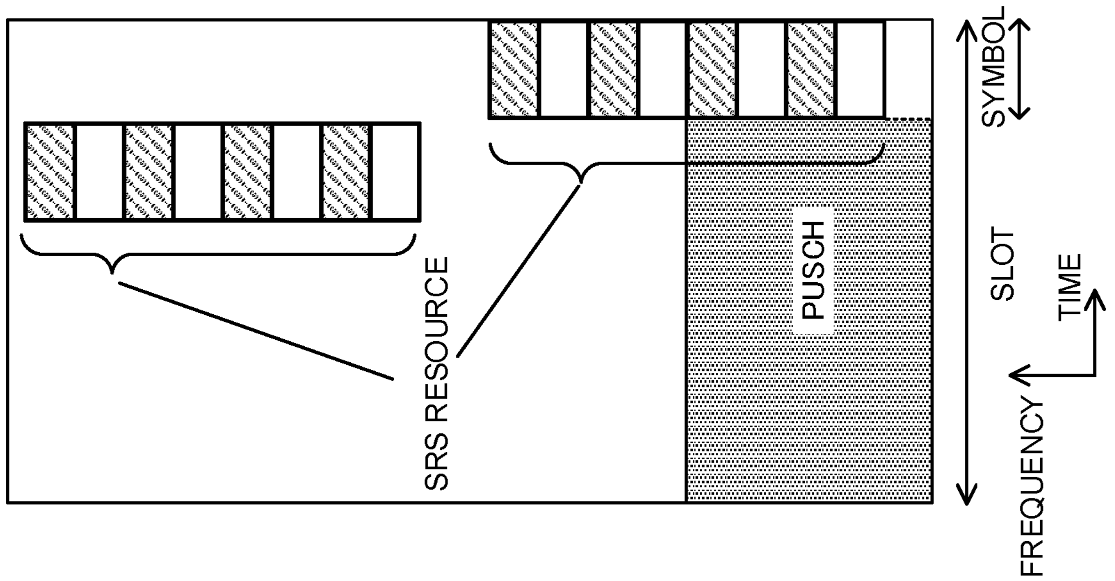

In an example shown in FIG. 7C, the scheduled PUSCH resource and the configured SRS resource are the same as those in FIG. 7A. In this case, the UE rate-matches (or punctures) the PUSCH in the symbol (period) where the SRS overlapping the PUSCH resource is configured, to transmit the SRS and the PUSCH.

Embodiment 2-4

The UE may be notified of, separately from the resource for the SRS, information indicating in which resource of the Comb the UL channel is to be rate-matched (or punctured) (target Comb).

For example, the UE may be notified of a bitmap indicating a Comb offset of the target Comb. The UE notified of the bitmap may rate-match or puncture the UL channel in an RE corresponding to the Comb offset indicated by the bitmap.

For example, the UE may be notified of the number of CDM (code division multiplexing) groups without data for the DMRS and also the number of Combs likely to be configured for some UEs or another UE. The UE notified of the number of Combs may determine the target Comb in accordance with a selection rule. For example, according to the selection rule, the UE may always prioritize and select, as the target Combs, Combs the number of which are that notified in ascending (or descending) order of the Comb offset, or may select, as the target Comb, Combs from the Comb offset notified as the SRS resource to the Comb offset obtained by incrementing (decrementing) by the number of notified combs. In a case that the Comb offset gets out of an effective range by the incrementing or the decrementing, the UE may keep the Comb offset within the effective range. For example, in a case that a maximum Comb offset is exceeded by the incrementing, the UE may obtain the Comb offset by a remainder of an increment result by the maximum Comb offset (modulo operation).

The notification of the target Comb may be notified as a part of the SRS resource using higher layer signaling, notified using the Medium Access Control (MAC) Control Element (CE), or notified using the DCI. For example, the notification may be made using higher layer signaling in a case of the P-SRS, the notification may be made using higher layer signaling and the MAC CE in a case of the SP-SRS, and the notification may be made using higher layer signaling and the DCI in a case of the A-SRS.

Figure 8:
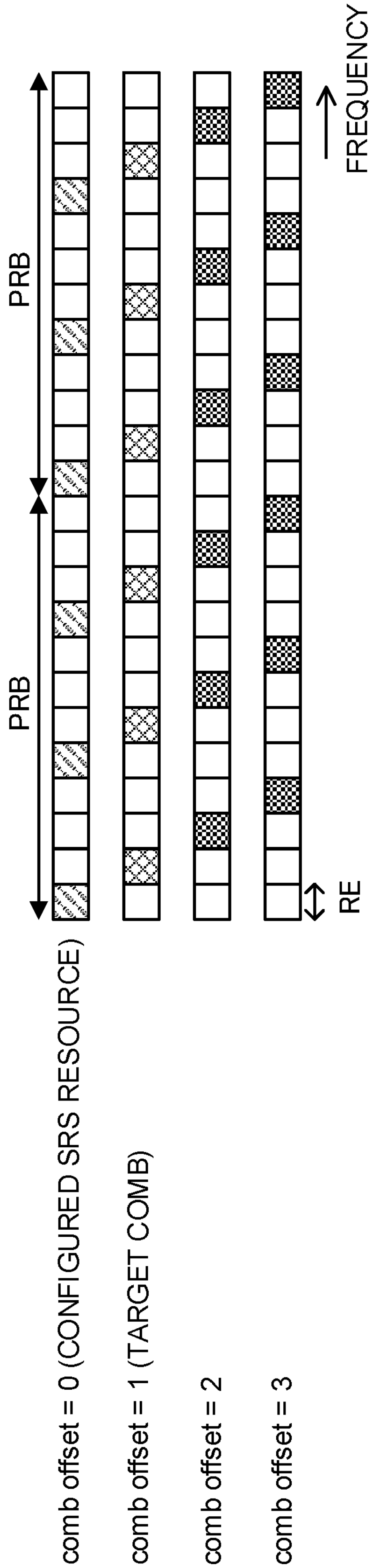
FIG. 8 is a diagram to show an example of a Comb structure for an SRS.

FIG. 8 shows a case that the UE is notified of Comb offset=0 as the SRS resource, and notified of Comb offset=1 as the target Comb. In this case, Comb offset=0 indicates the SRS resource (the RE used to for the SRS transmission). Comb offset=1 indicates not the RE used for the SRS transmission but the RE where the PUSCH is rate-matched (or punctured). Comb offset=2 and Comb offset=3 indicate not the RE used for the SRS transmission but the RE where the PUSCH is not rate-matched. In other words, Comb offset=2 and Comb offset=3 indicate the RE to which the PUSCH is mapped in a case that the PUSCH is scheduled.

Embodiment 2-5

In only a case that the UL channel is a Cyclic Prefix (CP)-OFDM (CP-OFDM waveform) (transform precoding is not applied to the UL channel), the UE may employ any one of Embodiments 2-1, 2-2, and 2-4 described above. In this case, a low peak to average power ratio (PAPR) sequence is used for the SRS, whereas in Embodiments 2-1, 2-2, and 2-4 described above, the SRS transmission and the UL channel transmission are likely to be frequency-division multiplexed (FDM), and thus, a combination of the CP-OFDM and FDM can suppress an increase in the PAPR.

In a case that the UL channel is a Discrete Fourier Transform-Spread (DFT-S)-OFDM (DFT-S-OFDM waveform) (transform precoding is applied to the UL channel), the UE may employ Embodiment 2-3 described above. In this case, a combination of the DFT-S-OFDM and the FDM can suppress an increase in the PAPR.

Embodiment 2-6

In Embodiments 2-1 and 2-2 described above, in the case that the DMRS for the UL channel is punctured, the UE may generate a DMRS sequence having a DMRS sequence length before the puncturing, or a DMRS sequence having the sequence length corresponding to a size (the number of REs) of a resource usable after the puncture.

Generating the DMRS sequence with the DMRS sequence length before the puncturing (e.g., low PAPR sequence) and puncturing the DMRS allow orthogonalization in a case that a DMRS of another UE having the same sequence length is multiplexed, and thus, interference between the UEs can be suppressed. Transmitting the DMRS sequence having the sequence length corresponding to the size of the resource usable after the puncture can suppress the PAPR. The DMRS sequence having the sequence length corresponding to the size of the resource usable after the puncturing may be defined by the specifications. The UE may not expect that the size of the resource usable after the puncturing is the sequence length not defined by the specifications.

According to Embodiment 2, in the case that the SRS resource overlaps the UL channel resource, decreasing the UL channel resource allows the UL channel and the SRS to be appropriately transmitted.

Embodiment 3

In Embodiment 3 below, a control method of retransmission of the UL channel in the case that the SRS resource overlaps the UL channel resource will be described.

In a case that the resource for the initial transmission of the UL channel overlaps the SRS resource, the UE may employ any one of Embodiments 3-1 to 3-3 described below.

Embodiment 3-1

The UE may control the rate-matching (or puncturing) of the UL channel per UL channel transmission (in each of the initial transmission and the retransmission) depending on whether or not the SRS resource overlaps the UL channel resource. In the case that the SRS resource overlaps the UL channel resource, the UE may not use the overlapped resource (RE, SRS resource range, or SRS symbol) to transmit the UL channel (may reduce the UL channel resource).

In a case that the UL channel resource overlaps the SRS resource in each of the initial transmission and the retransmission of the UL channel, the UE may transmit the UL channel and the SRS according to Embodiment 2-1.

In a case that the UL channel resource does not overlap the SRS resource in the retransmission of the UL channel, the UE may use the whole of the UL channel resource for the retransmission of the UL channel, or may use part of the UL channel resource for the retransmission of the UL channel. At least one of a transport block size (TBS), a resource size, and the number of coded bits may be the same between the initial transmission and the retransmission of the UL channel. In a case that the UL channel resource overlaps the SRS resource in the initial transmission of the UL channel, and the UL channel resource does not overlap the SRS resource in the retransmission of the UL channel, the UE may reduce the size of the UL channel resource in the retransmission (e.g., at least one of a PRB size and the number of allocation symbols). The UE may reduce the UL channel resource in the retransmission by a specific size until the TBS in the retransmission becomes equal to the TBS in the initial transmission. The specific size may be one physical resource block (PRB), or one physical resource block group (PRG). The PRG may be contiguous PRB to which the same DL precoding is applied. The UE may expect that the same precoding is applied to continuous DL allocation to a plurality of PRBs in the PRG.

Figures 9A, 9B, 9C:
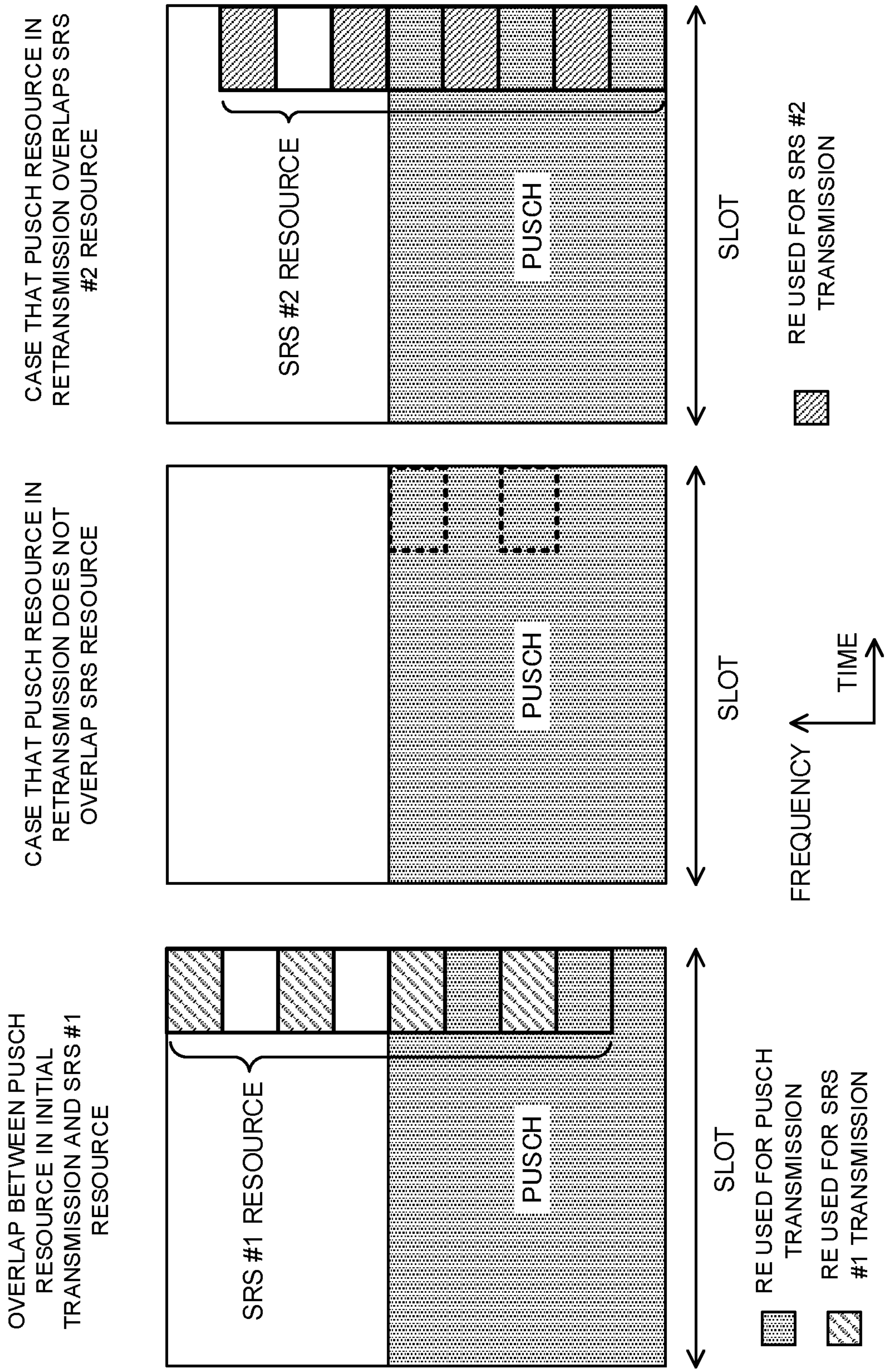
FIGS. 9A to 9C are diagrams to show examples of a control method in initial transmission and retransmission of an uplink channel.

In an example shown in FIG. 9A, the PUSCH resource overlaps the SRS resource (SRS #1) in the initial transmission of the PUSCH, similar to FIG. 5A described above, and the UE performs the initial transmission of the PUSCH and the transmission of the SRS (SRS #1) according to Embodiment 2-1. Either Embodiment 2-2 or 2-3 may be used instead of Embodiment 2-1.

In an example shown in FIG. 9B, in a case that the PUSCH resource does not overlap the SRS resource in the retransmission of the PUSCH in FIG. 9A, the UE uses the whole of the resource for the retransmission of the PUSCH, for the retransmission of the PUSCH. In other words, the UE uses, for the retransmission of the PUSCH, also the RE, in the resource for the initial transmission of the PUSCH, having an arrangement (symbol position and subcarrier position) the same as that of the RE overlapping the SRS.

In a case that the UL channel resource overlaps the SRS resource in the retransmission of the UL channel, the UE may, regarding the resource for the retransmission of the UL channel, not use, for the UL channel, an RE for the SRS (not performing mapping), and may use, for the UL channel, an RE not overlapping the RE for the SRS (may perform mapping).

In an example shown in FIG. 9C, in a case that the PUSCH resource overlaps the SRS resource in the retransmission of the PUSCH in FIG. 9A, and an arrangement of SRS #2 overlapping in the retransmission is different from an arrangement of SRS #1 overlapping in the initial transmission, the UE may, regarding the resource for the retransmission of the PUSCH, not use, for the PUSCH, an RE for SRS #2 and may use, for the PUSCH, an RE not overlapping the RE for SRS #2.

According to Embodiment 3-1, in the case that the initial transmission of the UL channel overlaps the SRS resource, and the retransmission of the UL channel does not overlap the SRS resource, the UE can efficiently transmit the UL channel.

Embodiment 3-2

The UE may use the resource having the arrangement used for the initial transmission of the UL channel (that is, the arrangement and size of the UL channel that is rate-matched (or punctured) due to the overlapping of the SRS and the initial transmission UL channel), as the UL channel resource in the retransmission.

In the case that the UL channel resource does not overlap the SRS resource in the retransmission of the UL channel, the UE may use, for the retransmission of the UL channel, the arrangement used for the initial transmission of the UL channel. In a case that the UE does not use, for the UL channel, the RE overlapping the SRS in the resource for the initial transmission of the UL channel, the UE may not use, for the retransmission of the UL channel, an RE at the same position as that of an RE not used for the initial transmission. In this case, the UE may not use, for the retransmission of the UL channel, the RE having the arrangement the same as that of the RE not used for the initial transmission, regardless of whether or not the resource for the retransmission overlaps the SRS resource.

Figures 10A, 10B, 10C:
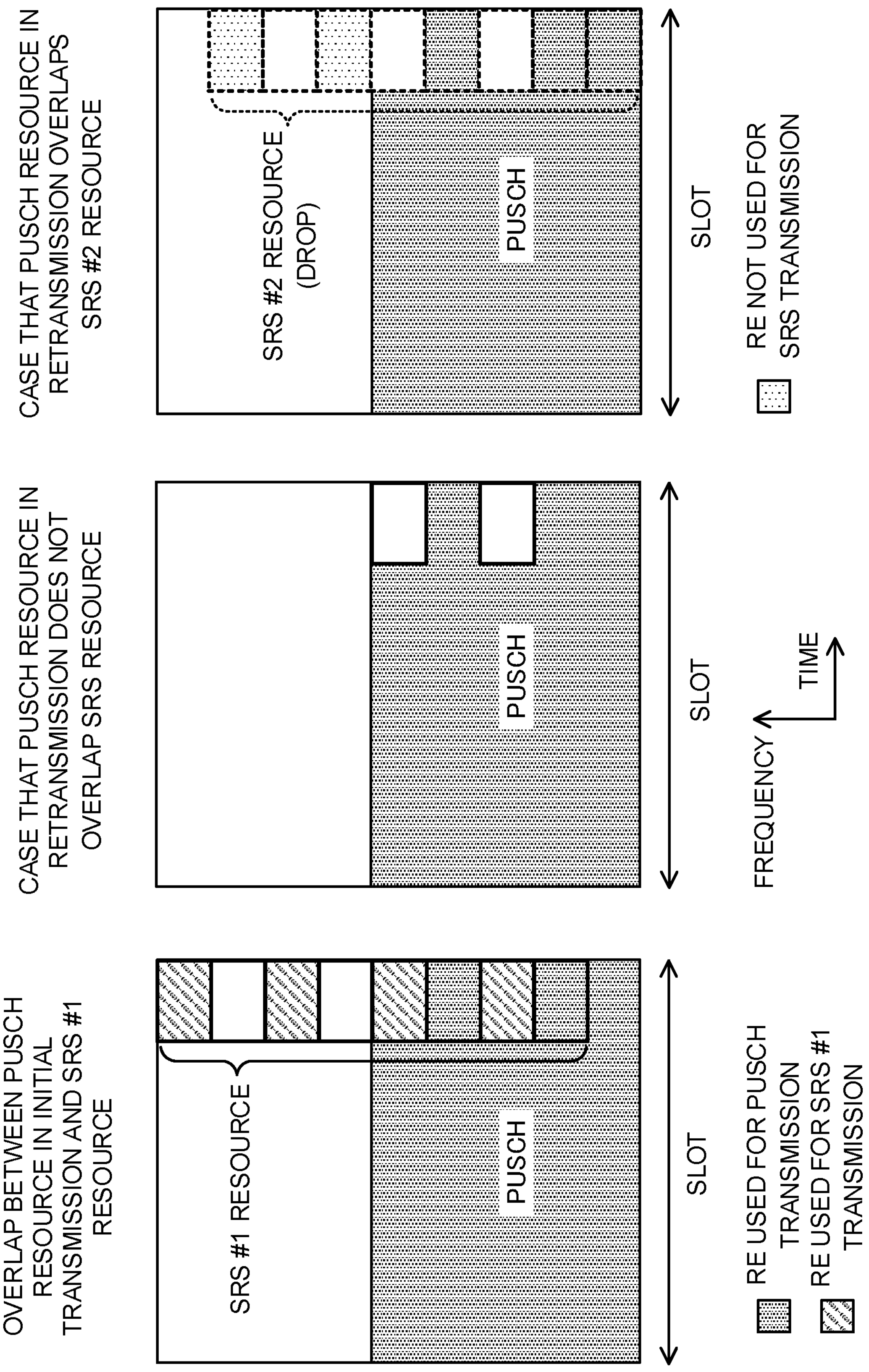
FIGS. 10A to 10C are diagrams to show examples of the control method in initial transmission and retransmission of an uplink channel.

An example shown in FIG. 10A is similar to that shown in FIG. 9A, and the UE performs the initial transmission of the PUSCH and the transmission of the SRS (SRS #1) according to Embodiment 2-1.

In an example shown in FIG. 10B, in the case that the PUSCH resource does not overlap the SRS resource in the retransmission of the PUSCH in FIG. 10A, the UE does not use, for the retransmission of the PUSCH, an RE having an arrangement the same as that of an RE not used for the initial transmission of the PUSCH in FIG. 10A (or rate-matches or punctures the retransmission of the PUSCH at a position the same as that in FIG. 10A), and performs the retransmission of the PUSCH.

In the case that the UL channel resource overlaps the SRS resource in the retransmission of the UL channel, the UE may, regarding the resource for the retransmission of the UL channel, not use, for retransmission of the UL channel, an RE having an arrangement the same as that of an RE not used for the initial transmission, and may use, for the retransmission of the UL channel, an RE having an arrangement the same as that of an RE used for the initial transmission (or may rate-match or puncture the retransmission of the PUSCH at the same position as that of the initial transmission). Furthermore, the UE may drop the SRS.

In an example shown in FIG. 10C, in a case that the PUSCH resource overlaps the SRS resource in the retransmission of the PUSCH in FIG. 10A, and an arrangement of SRS #2 overlapping in the retransmission is different from an arrangement of SRS #1 overlapping in the initial transmission, the UE, regarding the resource for the retransmission of the PUSCH, dose not map the PUSCH to an RE having an arrangement the same as an RE not used for the initial transmission of the PUSCH, performs the retransmission, and drops SRS #2.

In a case that the PUSCH resource overlaps the SRS resource in the retransmission of the PUSCH in FIG. 10A, and an arrangement of SRS #2 overlapping in the retransmission is the same as an arrangement of SRS #1 overlapping in the initial transmission, the UE, regarding the resource for the retransmission of the PUSCH, dose not map the PUSCH to an RE having an arrangement the same as an RE not used for the initial transmission of the PUSCH, performs the retransmission, and drops SRS #2.

According to Embodiment 3-2, the TBS can be equal between the initial transmission and the retransmission of the UL channel.

Embodiment 3-3

In the case that the UL channel resource overlaps the SRS resource in the retransmission of the UL channel, the UE may, regarding the resource for the retransmission of the UL channel, not use, for retransmission of the UL channel, an RE having an arrangement the same as an RE not used for the initial transmission and the RE for the SRS, and may use other REs for the retransmission of the UL channel (or may rate-match or puncture the retransmission of the PUSCH at the RE having the same arrangement as that in the initial transmission of the SRS and the RE for the retransmission of the SRS). Furthermore, the UE may transmit the SRS overlapping the resource for the retransmission of the UL channel.

Figure 11B:
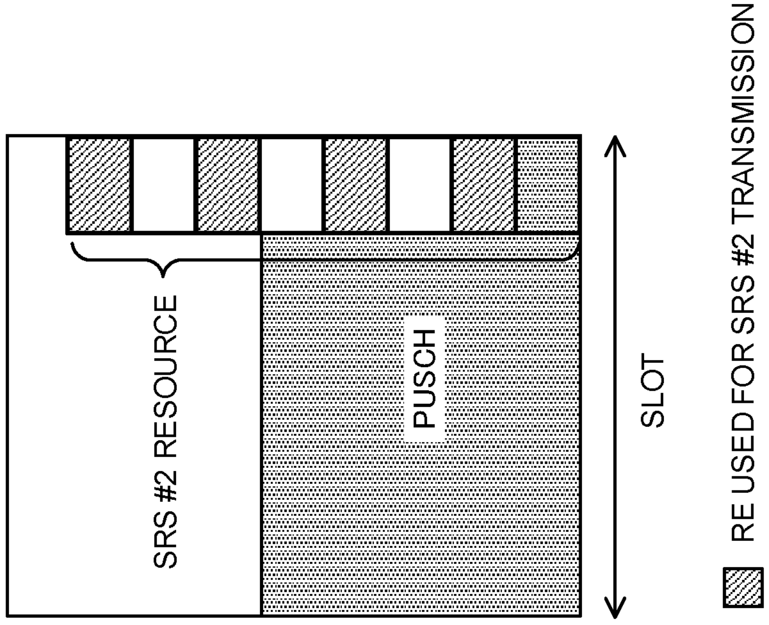
FIGS. 11A and 11B are diagrams to show examples of the control method in initial transmission and retransmission of an uplink channel.
Figure 11B:
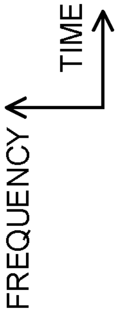
Figure 11A:
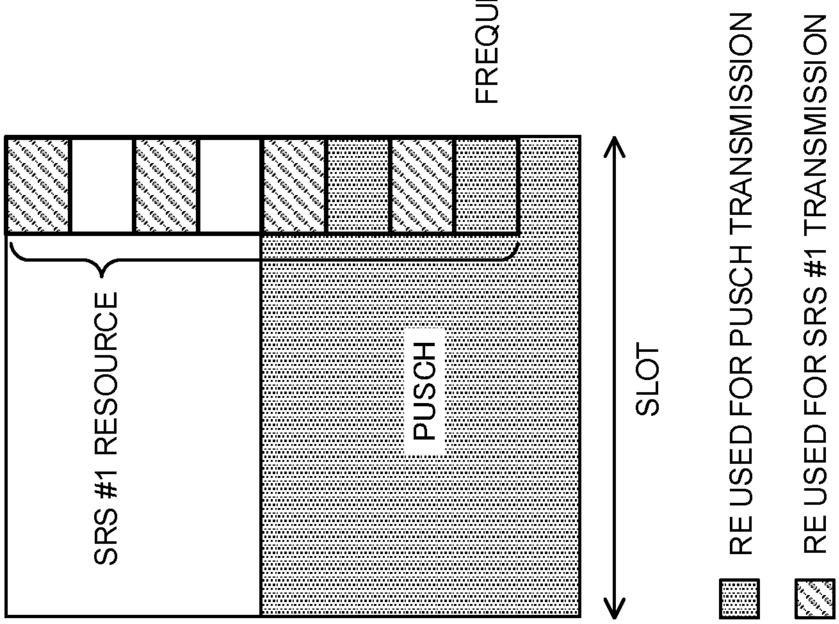

An example shown in FIG. 11A is similar to that shown in FIG. 9A, and the UE performs the initial transmission of the PUSCH and the transmission of the SRS (SRS #1) according to Embodiment 2-1.

In an example shown in FIG. 11B, in a case that the PUSCH resource overlaps the SRS resource in the retransmission of the PUSCH in FIG. 11A, and an arrangement of SRS #2 overlapping in the retransmission is different from an arrangement of SRS #1 overlapping in the initial transmission, the UE, regarding the resource for the retransmission of the PUSCH, dose not map the PUSCH to an RE having an arrangement the same as that of an RE not used for the initial transmission of the PUSCH and an RE for SRS #2, performs the retransmission, and transmits whole SRS #2.

In a case that the PUSCH resource overlaps the SRS resource in the retransmission of the PUSCH in FIG. 11A, and an arrangement of SRS #2 overlapping in the retransmission is the same as an arrangement of SRS #1 overlapping in the initial transmission, the UE, regarding the resource for the retransmission of the PUSCH, dose not map the PUSCH to an RE having an arrangement the same as that of an RE not used for the initial transmission of the PUSCH, performs the retransmission, and transmits whole SRS #2.

According to Embodiment 3-3, the SRS overlapping in the retransmission of the PUSCH can be transmitted on a priority basis.

Embodiment 4

In Embodiment 4 below, a control will be described in a case that the UL channel over a plurality of slots (multi-slot UL channel) is supported, in a case that the multi-slot UL channel overlaps the SRS.

Embodiment 4-1

The UE may control the rate-matching (or puncturing) of the UL channel per UL channel transmission slot in the multi-slot UL channel depending on whether or not the SRS resource overlaps the UL channel resource.

For example, in a case that the SRS resource overlaps the UL channel resource, the UE may not use the overlapped resource to transmit the UL channel (or may not map the UL channel to the overlapped resource), or in a case that the SRS resource does not overlap the UL channel resource, the UE may use the UL channel resource to transmit the UL channel (or may map the UL channel to the UL channel resource) in accordance with at least one of Embodiments 2-1 to 2-3.

Figure 12:
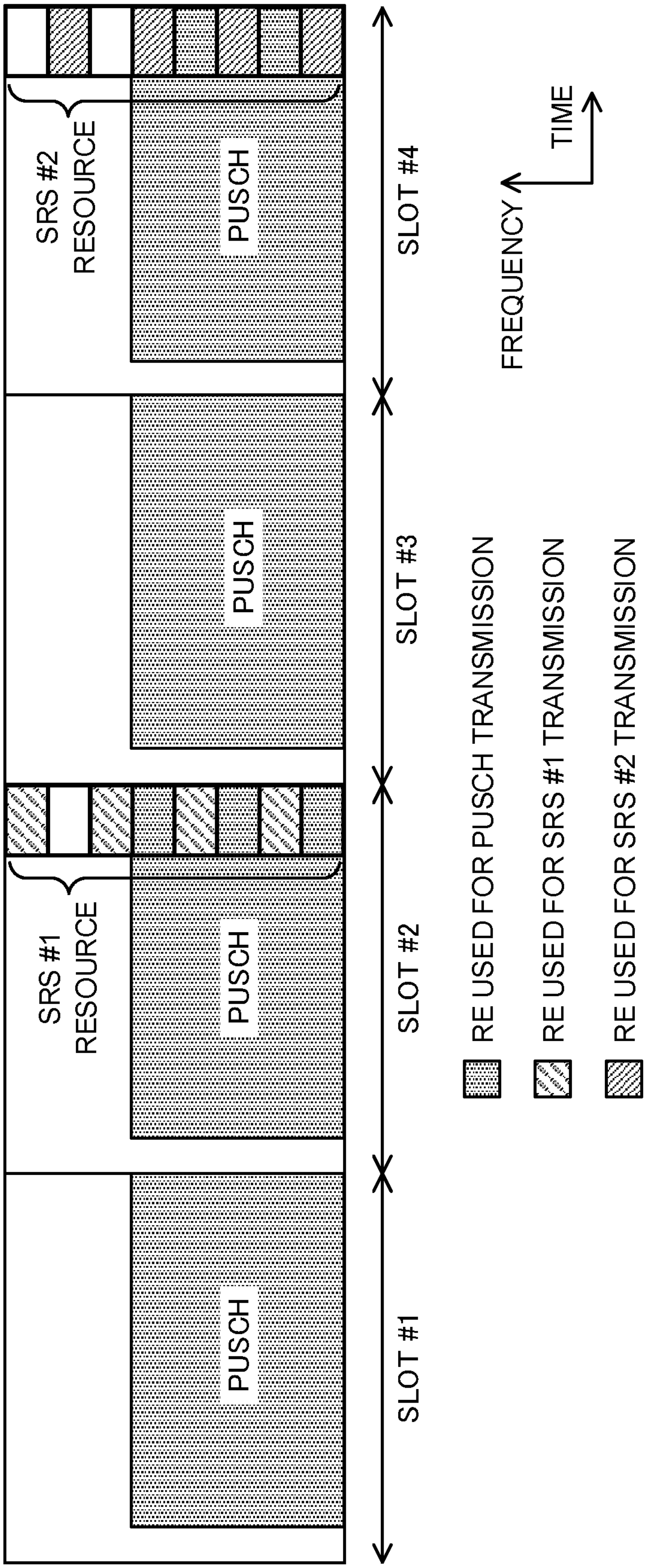
FIG. 12 is a diagram to show an example of a control method of a resource for an uplink channel and a resource for an SRS over a plurality of slots.

For example, as shown in FIG. 12, in a case that the resource for the PUSCH overlaps the resource for SRS #1 in slot #2, and the resource for the PUSCH overlaps the resource for SRS #2 in slot #4, the UE may not map the PUSCH to the RE where SRSs #1 and #2 overlap each other (or may rate-match or puncture the PUSCH in the RE where SRSs #1 and #2 overlap each other) in accordance with Embodiment 2-1.

Embodiment 4-2

The UE, regarding the UL channel resource in an initial slot of the multi-slot UL channel, may not use an RE not used for the UL channel transmission (an RE to which the UL channel is not mapped) for the UL channel in the slots after the initial slot (subsequent slots, the second and subsequent slots) (the UE may, regarding the UL channel resource in the initial slot, rate-match or puncture the UL channel in the subsequent slots in an arrangement the same as that of the RE not used for the UL channel transmission). The UE may use, for the UL channel in each subsequent slot, the UL channel arrangement used for the UL channel in the initial slot of the multi-slot UL channel. For control of the SRS overlapping the subsequent UL channel transmission slot in this case, any one of subsequent slot transmission methods 1 to 3 may be used.

[Subsequent Slot Transmission Method 1]

In a case that the SRS resource in the subsequent slot overlaps in an arrangement the same as that for the PUSCH transmission in the initial slot, the UE may always drop the overlapped SRS.

Figure 13:
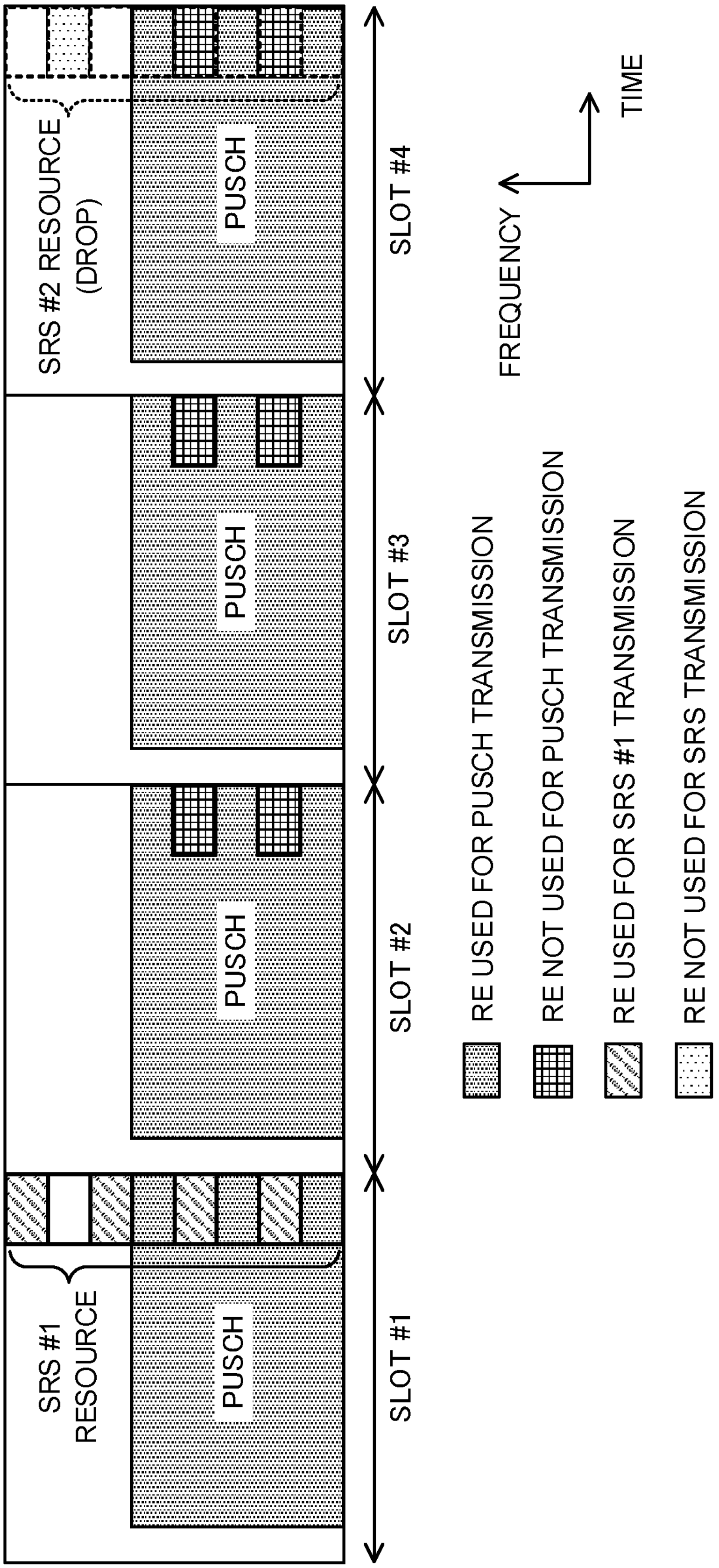
FIG. 13 is a diagram to show an example of the control method of a resource for an uplink channel and a resource for an SRS over a plurality of slots.

For example, as shown in FIG. 13, in a case that the resource for the PUSCH overlaps the resource for SRS #1 in an initial slot (slot #1) of a multi-slot PUSCH, and the resource for the PUSCH overlaps the resource for SRS #2 in slot #4, the UE does not map the PUSCH to an RE used for SRS #1 transmission in the PUSCH resource in slot #1, and maps the PUSCH to other REs to transmit. In this case, the UE uses the arrangement used for the PUSCH transmission in slot #1 for the PUSCH transmission in slots #2 to (or maps the PUSCH to the arrangement in slots #2 to 4 the same as that for the PUSCH transmission in slot #1). In the slot #4, the UE drops SRS #2 overlapping the PUSCH resource.

According to the subsequent slot transmission method 1, the TBS can be equal between the slots to suppress the load on the UE.

[Subsequent Slot Transmission Method 2]

In a case that the RE for the SRS overlaps an RE having an arrangement the same as that for the PUSCH transmission in the initial slot, in a subsequent slot, the UE may drop the SRS. In a case that the RE for the SRS does not overlap an RE having an arrangement the same as that for the PUSCH transmission in the initial slot, in a subsequent slot, the UE may transmit the SRS.

For example, similar to FIG. 13 described above, in a case that an RE having an arrangement the same as that for the PUSCH transmission in slot #1 overlaps an RE for SRS #2 in slot #4 (or in a case that an arrangement of the RE for SRS #2 is different from an arrangement of the RE for SRS #1), the UE drops SRS #2 similar to FIG. 13.

Figure 14:
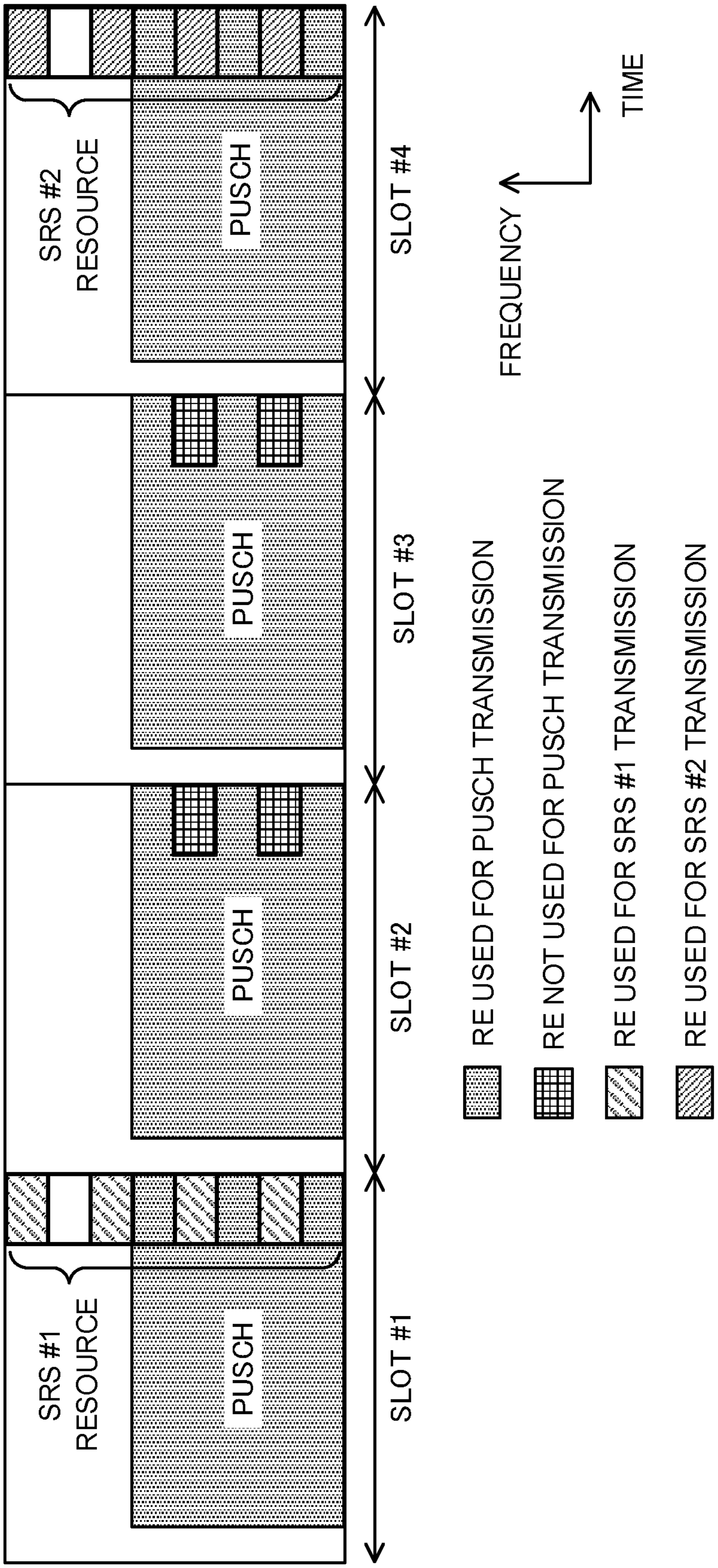
FIG. 14 is a diagram to show an example of the control method of a resource for an uplink channel and a resource for an SRS over a plurality of slots.

For example, as shown in FIG. 14, similar to FIG. 13, although an RE having an arrangement the same as that for the PUSCH in slot #1 is used for the PUSCH in slots #2 to #4, in a case that the RE having the arrangement does not overlap an RE for SRS #2 in slot #4 (the arrangement of the RE for SRS #2 is the same as the arrangement of the RE for SRS #1), the UE transmits whole SRS #2.

According to the subsequent slot transmission method 2, the TBS can be equal between the slots to suppress the load on the UE.

[Subsequent Slot Transmission Method 3]

In a case that the SRS resource overlaps the UL channel resource in a subsequent slot, the UE may transmit the SRS in the subsequent slot. In this case, the UE may not use, for the UL channel transmission in the subsequent slot, an RE having an arrangement the same as the RE for the SRS in the initial slot (the RE not used for the UL channel transmission in the initial slot) and the RE for the SRS (or may rate-match or puncture the UL channel in the RE having the arrangement the same as the SRS in the initial slot and in the RE for the SRS, in the subsequent slot).

Figure 15:
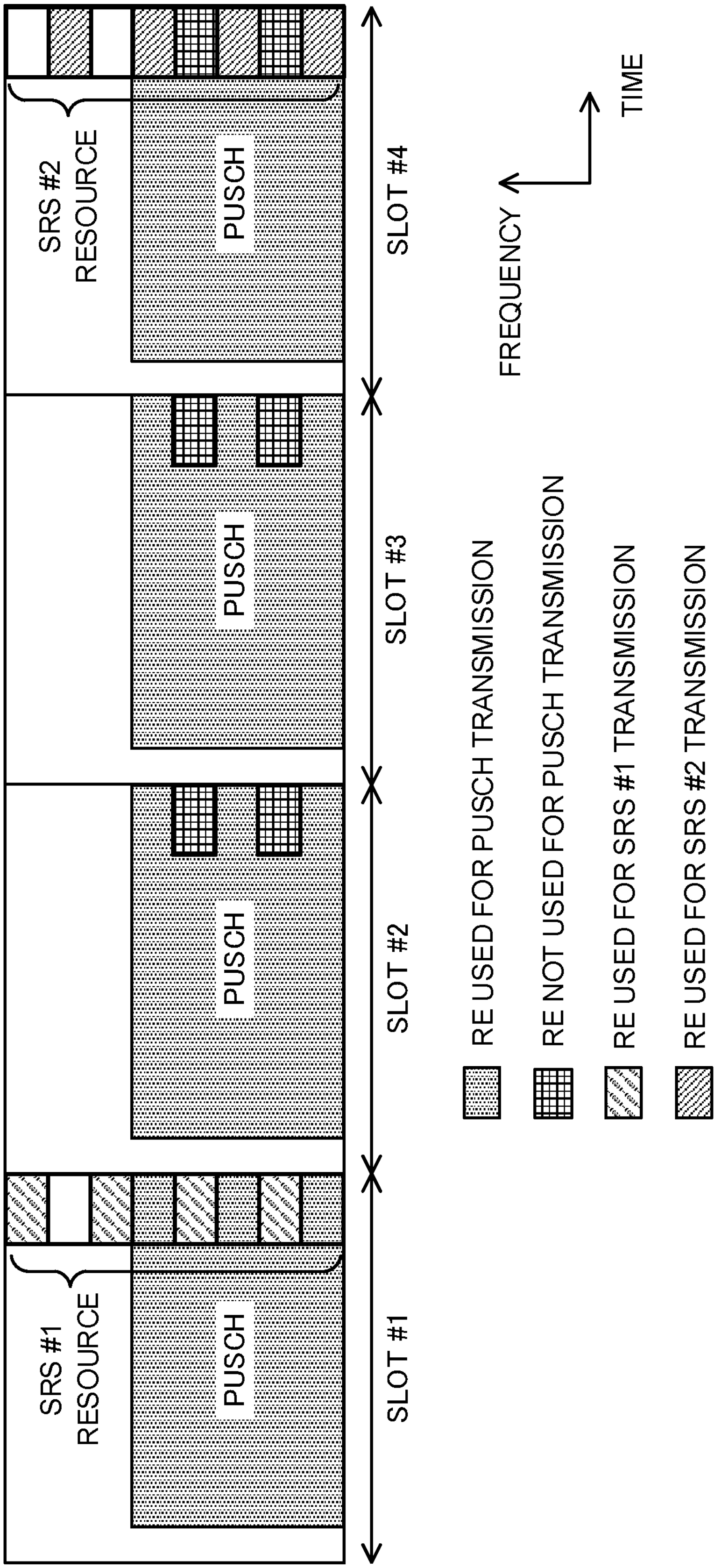
FIG. 15 is a diagram to show an example of the control method of a resource for an uplink channel and a resource for an SRS over a plurality of slots.

For example, as shown in FIG. 15, similar to FIG. 13 described above, in the case that an RE having an arrangement the same as that for the PUSCH transmission in slot #1 overlaps an RE for SRS #2, in slot #4 (or in the case that an arrangement of the RE for SRS #2 is different from an arrangement of the RE for SRS #1), the UE transmits, in slot #4, the PUSCH without using, for the PUSCH in slot #4, the RE having the arrangement the same as that of the RE for SRS #1 in slot #1 and the RE for SRS #2, and transmits SRS #2.

Embodiment 4-3

The UE need not necessarily use, for the UL channel transmission in all the slots, a resource having an arrangement the same as that of the SRS resource (SRS resource range) overlapping, in at least one slot, the UL channel resource in the multi-slot UL channel (or may map, in none of slots, the UL channel to the resource having the arrangement the same as that of the SRS resource overlapping in at least one slot, to transmit the UL channel) (or may rate-match or puncture the UL channel in the resource, in all the slots, having the arrangement the same as those of the SRS resource overlapping in at least one slot).

Figure 16:
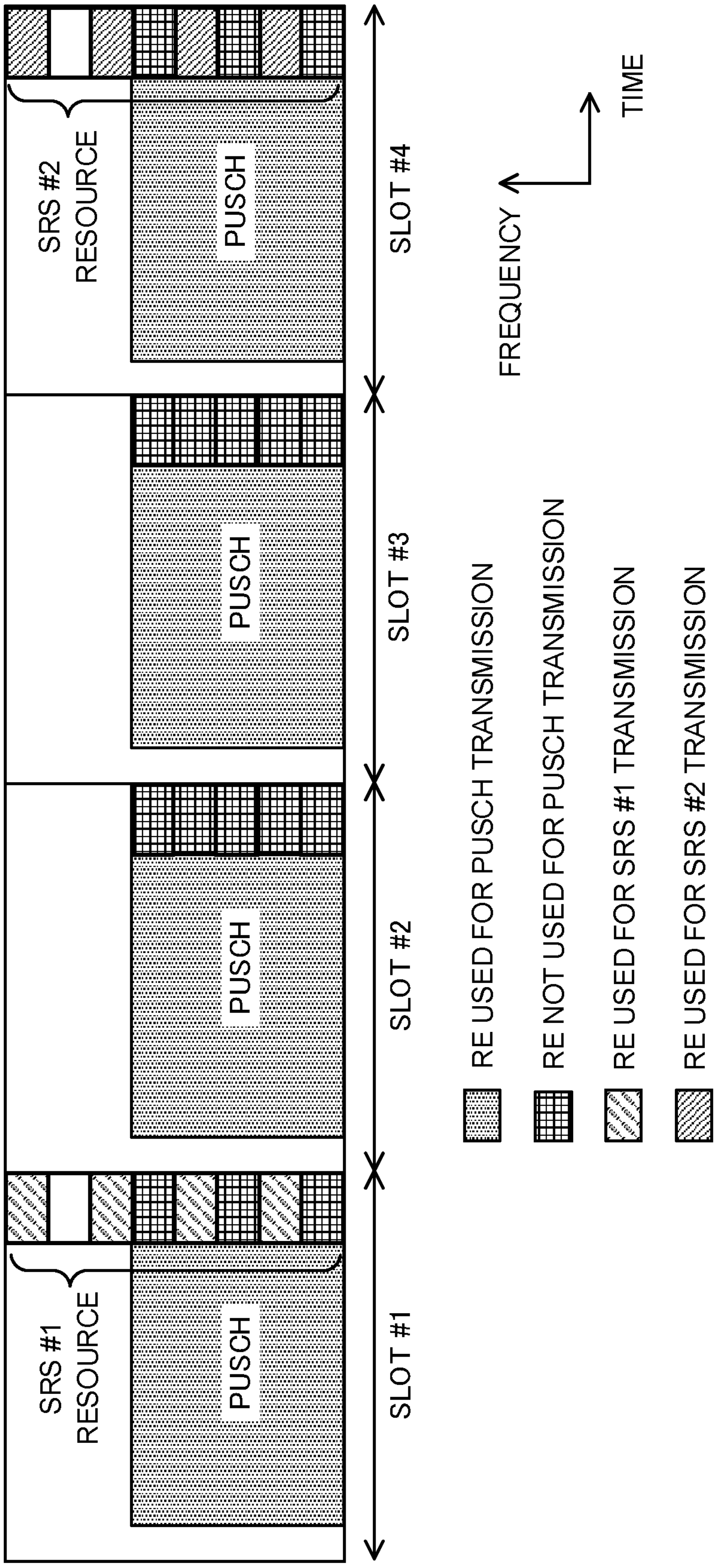
FIG. 16 is a diagram to show an example of the control method of a resource for an uplink channel and a resource for an SRS over a plurality of slots.

For example, as shown in FIG. 16, in a case that the PUSCH resource overlaps the resource for SRS #1 in slot #1, and the PUSCH resource overlaps the resource for SRS #2 in slot #4, the UE transmits the PUSCH without using, for the PUSCH, a whole resource, in the all slots #1 to #4, having an arrangement the same as the resources for SRS #1 and SRS #2, and transmits whole SRSs #1 and #2.

The UE need not necessarily use, for the UL channel in all the slots in the multi-slot UL channel, an RE having an arrangement the same as that of the RE for the SRS overlapping the UL channel resource in at least one slot in the multi-slot UL channel (or may map the RE having the arrangement the same as that of the RE for the SRS overlapping the UL channel resource in at least one slot in the multi-slot UL channel, to the UL channel in none of slots in the multi-slot UL channel, to transmit the UL channel) (or may rate-match or puncture the UL channel in all the slots in the multi-slot UL channel in the RE having the arrangement the same as that of the RE for the SRS overlapping the UL channel resource in at least one slot in the multi-slot UL channel).

According to Embodiment 4-3, the TBS can be equal between the slots, the SRS can be transmitted in every slot, and at least one of the throughput increase and the quality improvement by the SRS measurement is enabled.

Embodiment 4-4

In Rel. 15 NR, the SRS can be mapped to up to four contiguous symbols (multi-symbol SRS). In Rel. 15 NR, a short PUCCH mapped to one or two symbols (e.g., PUCCH formats 0, 2) is defined. Different spatial relations (beams, spatial domain transmission filters) may be applied to a plurality of symbols in the multi-symbol SRS.

In a case that the multi-symbol SRS overlaps (collides with) the short PUCCH, the UE may perform processing in accordance with any one of processing methods 1 to 4 described below.

[Processing Method 1]

In a case that the multi-symbol SRS at least partially collides with the short PUCCH, the UE may rate-match or puncture the multi-symbol SRS or the short PUCCH only at the collided portion. In this case, the UE may puncture the multi-symbol SRS and transmit the whole short PUCCH.

[Processing Method 2]

In the case that the multi-symbol SRS at least partially collides with the short PUCCH, the UE may rate-match or puncture the multi-symbol SRS or the short PUCCH only in the collided symbol. In this case, the UE may puncture the multi-symbol SRS and transmit the whole short PUCCH.

[Processing Method 3]

In the case that the multi-symbol SRS at least partially collides with the short PUCCH, the UE may drop the multi-symbol SRS.

[Processing Method 4]

In the case that the multi-symbol SRS at least partially collides with the short PUCCH, the UE may drop the short PUCCH.

According to the above embodiments, even in the case that the resource for the SRS overlaps the resource for the UL channel, the UL transmission can be appropriately controlled.

Embodiment 5

Since the SRS is transmitted in a wide band, a resource for a UL channel of a UE may overlap a resource for an SRS of another UE.

Figure 17A:
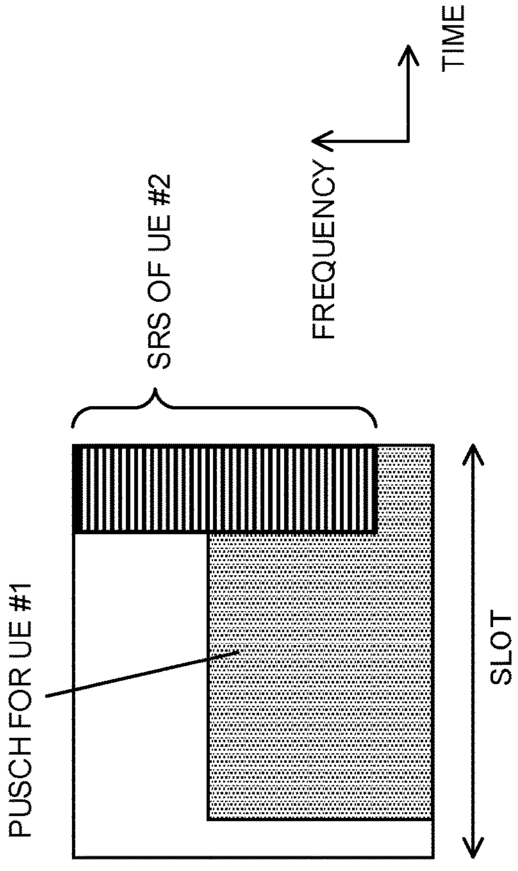
FIGS. 17A and 17B are diagrams to show examples in which an uplink channel resource for a UE overlaps an SRS for another UE.
Figure 17B:
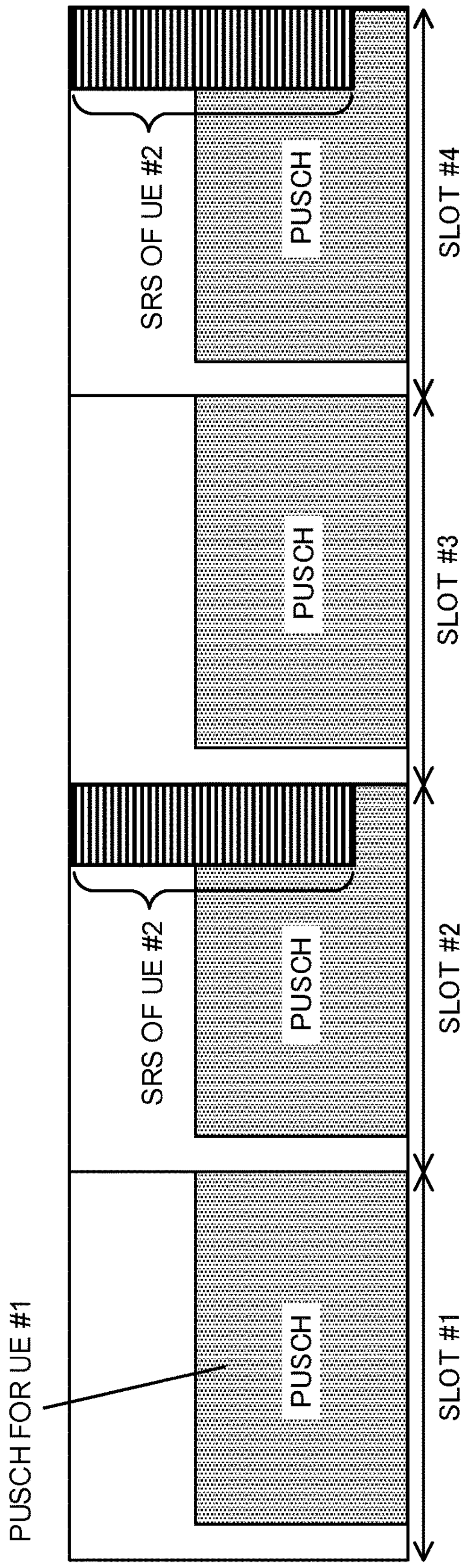

For example, as shown in FIG. 17A, a case may be conceivable that a PUSCH resource for UE #1 in one slot overlaps an SRS resource for UE #2. As shown in FIG. 17B, a case may be conceivable that the PUSCH resource for UE #1 over slots #1 to #4 (multi-slot PUSCH) overlaps the SRS resource for UE #2 in slot #2 and the SRS resource for UE #2 in slot #4.

In such a case, if UE #1 cannot appropriately control the UL channel resource for UE #1 overlapping the SRS resource for UE #2, the communication quality degrades.

Then, the inventors of the present invention came up with a method for appropriately controlling the UL transmission resource overlapping an SRS resource for another UE.

The UE may be configured with a zero power (ZP)-SRS resource as well as an SRS resource (non-zero power (ZP)-SRS resource). The NZP-SRS may be interpreted as an SRS with a non-zero power, an SRS actually transmitted, an SRS having a transmission power, and the like. The ZP-SRS may be interpreted as an SRS with zero power, an SRS not actually transmitted, the SRS not having a transmission power, and the like.

The ZP-SRS resource may be configured for (received by) the UE through higher layer signaling (e.g., SRS configuration information, SRS resource set configuration information, SRS resource configuration information, ZP-SRS configuration information, ZP-SRS resource set configuration information, ZP-SRS resource configuration information, or the like). The ZP-SRS resource may be notified as an SRS resource set or SRS resource configured with a new usage such as that indicating a usage in the SRS resource set is a ZP-SRS (e.g., zeroPower), or may be configured or defined by a new parameter (e.g., ZP-SRS resource set or ZP-SRS resource). The ZP-SRS resource may be a resource with frequency hopping.

The ZP-SRS resource and the ZP-SRS resource set including the ZP-SRS resource may be interchangeably interpreted.

At least one of the NZP-SRS and the ZP-SRS may be configured for (mapped to) other symbols than the last four symbols in a slot, or any symbols in a slot.

Similar to the type of the SRS (P-SRS, SP-SRS, A-SRS), a type of the ZP-SRS (P-ZP-SRS, SP-ZP-SRS, A-ZP-SRS) may be defined. The type of the ZP-SRS may be configured through higher layer signaling.

At least one of activation and deactivation of the SP-ZP-SRS may be controlled through at least either MAC layer signaling or the DCI.

It may be expected that the spatial relation is not configured for at least either the ZP-SRS resource set or the resource. Transmission power control (TPC) parameters (α, P0, and the like) may not be configured.

The UE configured with the ZP-SRS resource may not transmit the SRS (NZP-SRS) in the ZP-SRS resource. The UE configured with the ZP-SRS resource may not transmit the PUSCH or the DMRS for the PUSCH in the ZP-SRS resource. The UE configured with the ZP-SRS resource may not transmit the PUCCH or the DMRS for the PUCCH in the ZP-SRS resource.

The UE configured with the ZP-SRS resource may transmit the PUCCH or the DMRS for the PUCCH in the ZP-SRS resource. In this case, an effect of DL throughput increase can be achieved.

The UE configured with the ZP-SRS resource may transmit the PUCCH including a specific type of uplink control information (UCI) (e.g., HARQ-ACK or the like) or the DMRS for the PUCCH. In this case, an effect of DL throughput increase can be achieved.

Structure of ZP-SRS

A structure of the ZP-SRS may have the Comb structure similar to the structure of the SRS. The UE may be configured with, as the Comb structure, any one of Comb 2 (ZP-SRS of one RE is mapped every two REs, FIG. 18A), Comb 4 (ZP-SRS of one RE is mapped every four REs, FIG. 18B), and no Comb (the ZP-SRS is mapped in all REs in a band configured with the ZP-SRS resource (PRB, range), for example, Comb 0, Comb value=0, FIG. 18C). In a case that a plurality of terminals configured with the different Comb offsets that are the same in the time and frequency resources as the SRS resources perform the SRS transmission, the UE being configured with no Comb can prevent overlap between the UL transmission of the UE and the SRSs corresponding to the all Comb offsets for another UE.

The UE may be configured with, as the ZP-SRS structure, a structure the same as the SRS structure in Rel. 15 NR, or a structure encompassing the SRS structure in Rel. 15 NR. The UE can specify the resource for the ZP-SRS similar to the resource for the NZP-SRS.

In the case that the resource for the ZP-SRS overlaps the resource for the UL channel (e.g., at least one of PUSCH and PUCCH), the UE may rate-match (or puncture) the UL channel to transmit the UL channel.

In at least one of Embodiments 1 to 4 described above, the SRS may be interpreted as the ZP-SRS. In this case, an RE indicated by the ZP-SRS resource or the Comb structure of the ZP-SRS resource may not be used for the UL transmission (or the UL transmission may not be mapped) (or the UL transmission may not be dropped, punctured, or rate-matched in the RE indicated by the ZP-SRS resource or the Comb structure of the ZP-SRS resource).

In a case that the resource for the ZP-SRS overlaps the resource for the UL channel, the UE may rate-match (or puncture) the UL channel according to any one of Embodiments 5-1 to 5-3 described below.

Embodiment 5-1

Figures 18A, 18B, 18C:
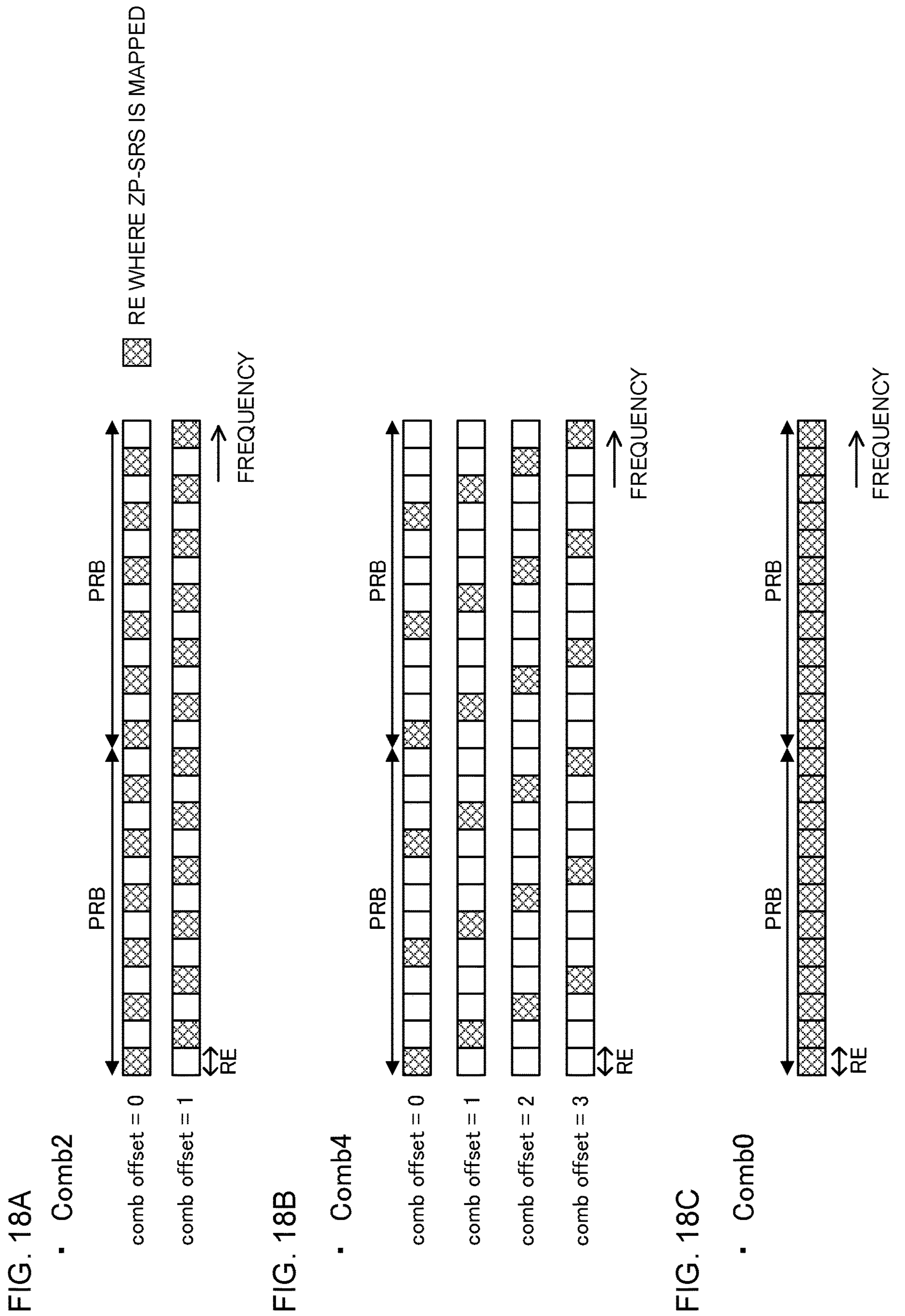
FIGS. 18A to 18C are diagrams to show examples of a Comb structure for a ZP-SRS.

In the case that the resource for the ZP-SRS overlaps the resource for the UL channel, the UE may not use an RE overlapping the resource element (RE) for the ZP-SRS for transmitting the DMRS for the UL channel (or may rate-match (or puncture) the UL channel in the RE where the ZP-SRS is effective). Here, the RE where the ZP-SRS is effective is the RE indicated by the Comb structures as shown in FIG. 18A to FIG. 18C.

Figures 19A, 19B, 19C:
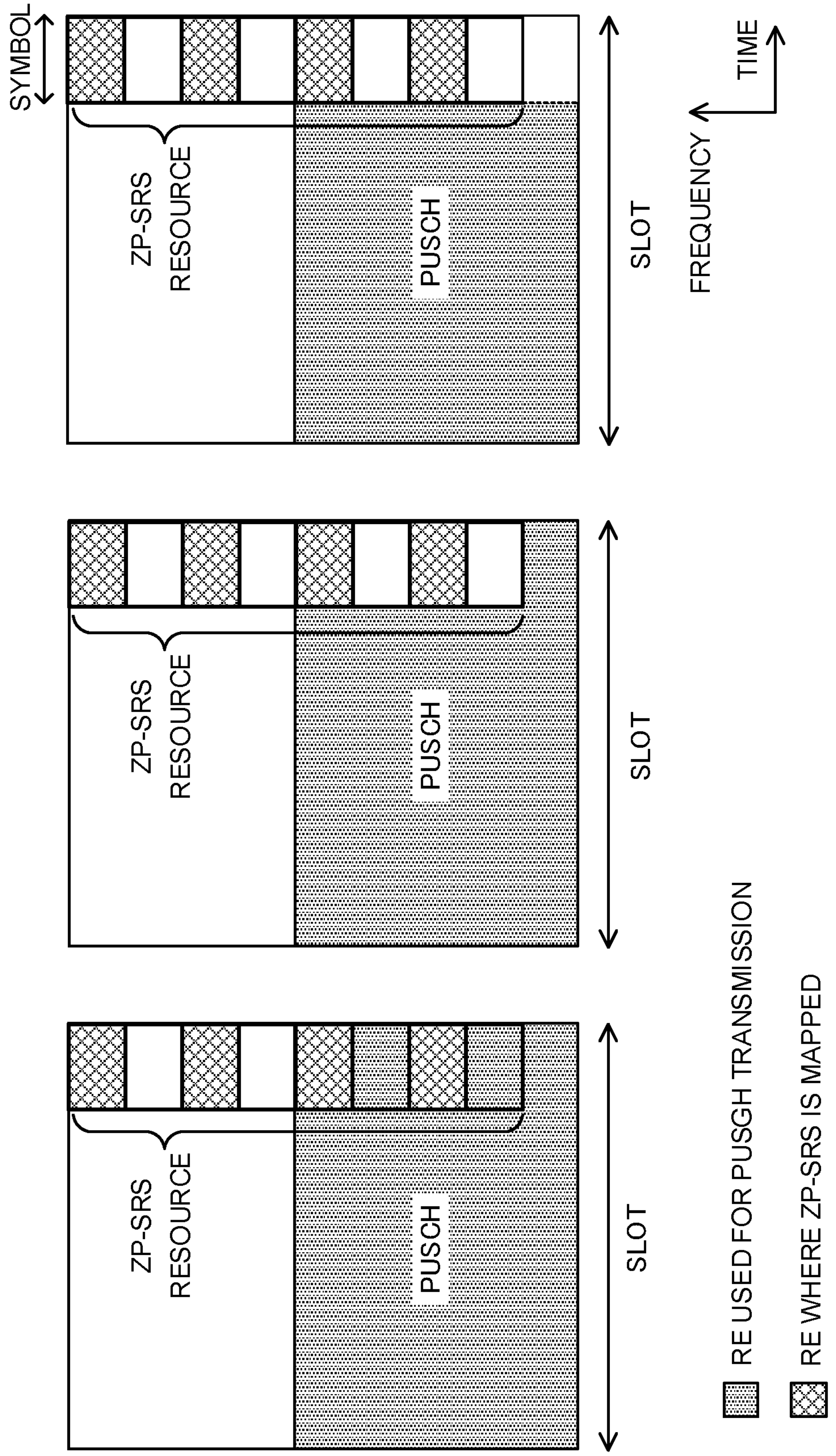
FIGS. 19A to 19C are diagrams to show examples of a control method in a case that a resource for an uplink channel overlaps a resource for a ZP-SRS.

For example, as shown in FIG. 19A, in a case that the configured ZP-SRS resource of Comb 2 overlaps the PUSCH resource, the UE rate-matches (or punctures) the PUSCH in the RE where the ZP-SRS is effective, to transmit the PUSCH.

In this case, the UL channel transmission can be efficiently performed while minimizing increase in the coding rate for the UL channel to suppress communication quality reduction, and thus, the throughput of the UL channel can be improved.

Embodiment 5-2

In the case that the resource for the ZP-SRS overlaps the resource for the UL channel, the UE may not use the resource configured for the ZP-SRS (ZP-SRS resource range) for transmitting the UL channel and the DMRS for the UL channel, and may rate-match (or puncture) the UL channel in the ZP-SRS resource range. In a case that the ZP-SRS resource having the Comb structure is configured for the UE, the ZP-SRS resource range includes not only the RE indicated by the value of the configured Comb offset, but also the RE indicated by other values of the Comb offset.

For example, as shown in FIG. 19B, similar to FIG. 19A described above, in the case that the ZP-SRS resource overlaps the PUSCH resource, the UE rate-matches (or punctures) the PUSCH in the ZP-SRS resource range to transmit the PUSCH.

The ZP-SRS resource range may be used by another UE for the SRS transmission. Therefore, according to Embodiment 5-2, even if a Comb different from the Comb of the configured ZP-SRS resource is used for the SRS transmission of another UE, the UE can prevent the UL channel of the UE from colliding or interfering with the SRS of another UE.

Embodiment 5-3

In the case that the resource for the ZP-SRS overlaps the resource for the UL channel, the UE may not use the symbol for the ZP-SRS for transmitting the UL channel and the DMRS for the UL channel, and may rate-match (or puncture) the UL channel in the symbol for the ZP-SRS (all REs in the symbol for the ZP-SRS).

For example, as shown in FIG. 19C, similar to FIG. 19A described above, in the case that the ZP-SRS resource overlaps the PUSCH resource, the UE rate-matches (or punctures) the PUSCH in the symbol (period) where the ZP-SRS is configured, to transmit the PUSCH.

In this case, in the symbol for the ZP-SRS overlapping the UL channel of the UE, another SRS having a different length (bandwidth) may be transmitted by another UE. The UL channel being not mapped to the symbol for the ZP-SRS can prevent the UL channel of the UE from colliding or interfering with the SRS of another UE in the symbol.

Embodiment 6

In a case that the ZP-SRS resource overlaps the NZP-SRS resource, the UE may drop or puncture the NZP-SRS.

In the case that the ZP-SRS resource overlaps the NZP-SRS resource, the UE may drop or puncture the NZP-SRS according to any one of Embodiments 6-1 to 6-4 described below.

Embodiment 6-1

In the case that the ZP-SRS resource overlaps the NZP-SRS resource, the UE may not transmit the NZP-SRS in an RE where the ZP-SRS is mapped. In other words, the UE may puncture or drop the RE for the NZP-SRS overlapping the RE where the ZP-SRS is mapped.

Figures 20A, 20B, 20C:
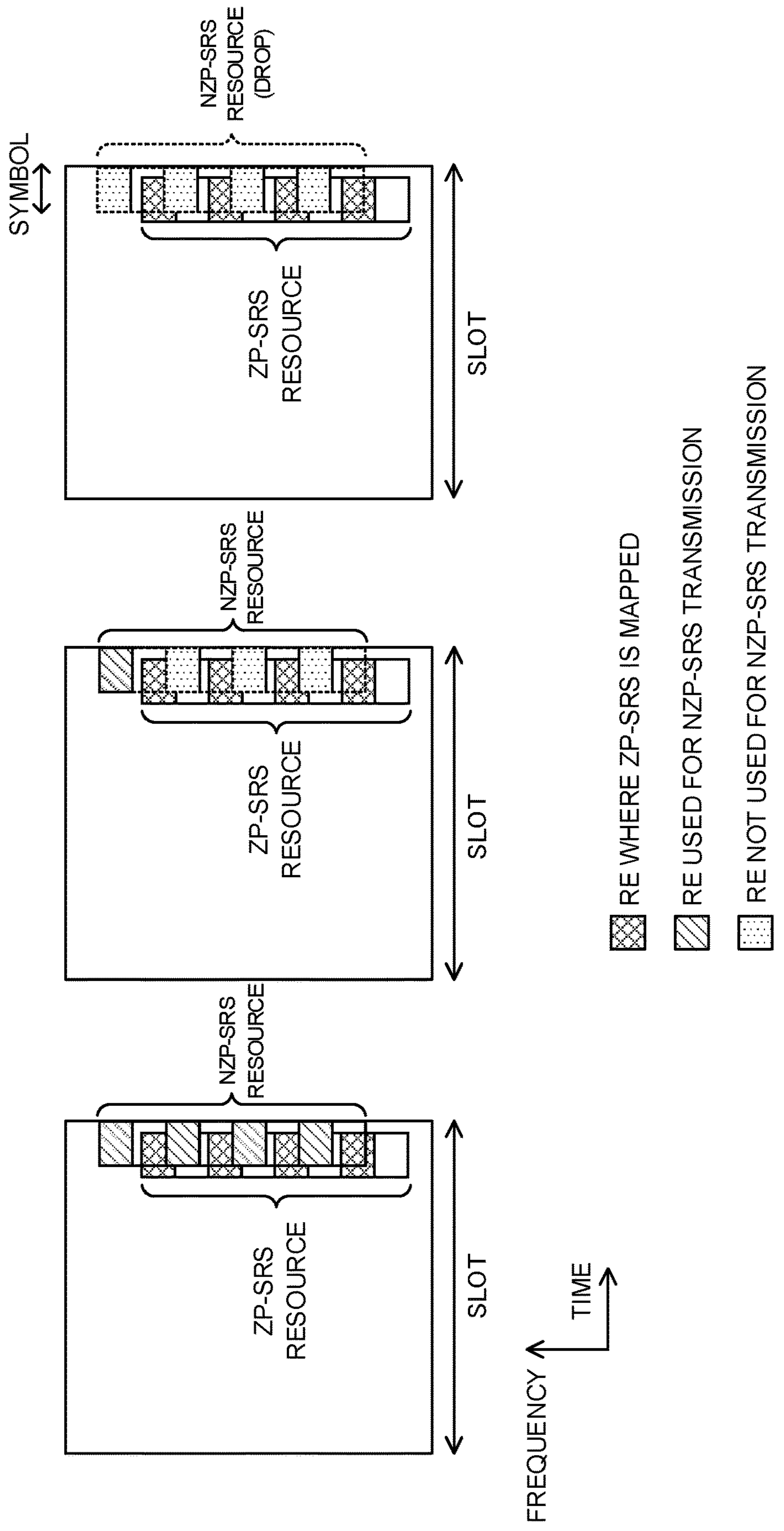
FIGS. 20A to 20C are diagrams to show examples of a control method in a case that a resource for a ZP-SRS overlaps a resource for an NZP-SRS.

In an example shown in FIG. 20A, the ZP-SRS resource overlaps the NZP-SRS resource, but the RE where the ZP-SRS is mapped does not overlap the RE for the NZP-SRS. In this case, the UE transmits the whole NZP-SRS (or does not puncture the NZP-SRS).

According to Embodiment 6-1, the transmission being not performed in at least part of the resource for the NZP-SRS allows the efficient UE multiplex.

Embodiment 6-2

In the case that the ZP-SRS overlaps the NZP-SRS, the UE may not transmit the NZP-SRS in an RE overlapping the resource configured for the ZP-SRS (including the Comb not configured for the ZP-SRS and the RE where the NZP-SRS is not mapped).

For example, as shown in FIG. 20B, in the case that ZP-SRS resource overlaps the NZP-SRS resource, the UE does not use a resource overlapping the resource configured for the ZP-SRS (ZP-SRS resource range), for the NZP-SRS transmission (or punctures the NZP-SRS in the RE overlapping the resource configured for the ZP-SRS).

The ZP-SRS resource (including the Comb and RE that are configure for the ZP-SRS but not used) may be used by another UE as the resources for the SRS and UL channel. By use of Embodiment 6-2, even if the ZP-SRS resource is used by another UE, the NZP-SRS of the UE can be prevented from colliding or interfering with the SRS and UL channel of the other UE.

Embodiment 6-3

In the case that the ZP-SRS overlaps the NZP-SRS, the UE may not transmit the NZP-SRS in a symbol for the ZP-SRS.

For example, as shown in FIG. 20C, in the case that the ZP-SRS resource overlaps the NZP-SRS resource, the UE does not transmit NZP-SRS in the symbol where the ZP-SRS resource is configured (or drops the NZP-SRS).

In this case, in a symbol for a ZP-SRS of a UE, another SRS having a different length (sequence length, bandwidth) may be transmitted by another UE. The UL transmission of the UE being not mapped to the symbol for the ZP-SRS can prevent colliding or interfering with the SRS having a different length (sequence length, bandwidth) of another UE.

Embodiment 6-4

In a case that the NZP-SRS is frequency-hopped, in a case that at least part of the ZP-SRS resource overlaps at least part of the NZP-SRS resource, the UE may not transmit the NZP-SRS in the slot.

Figure 21:
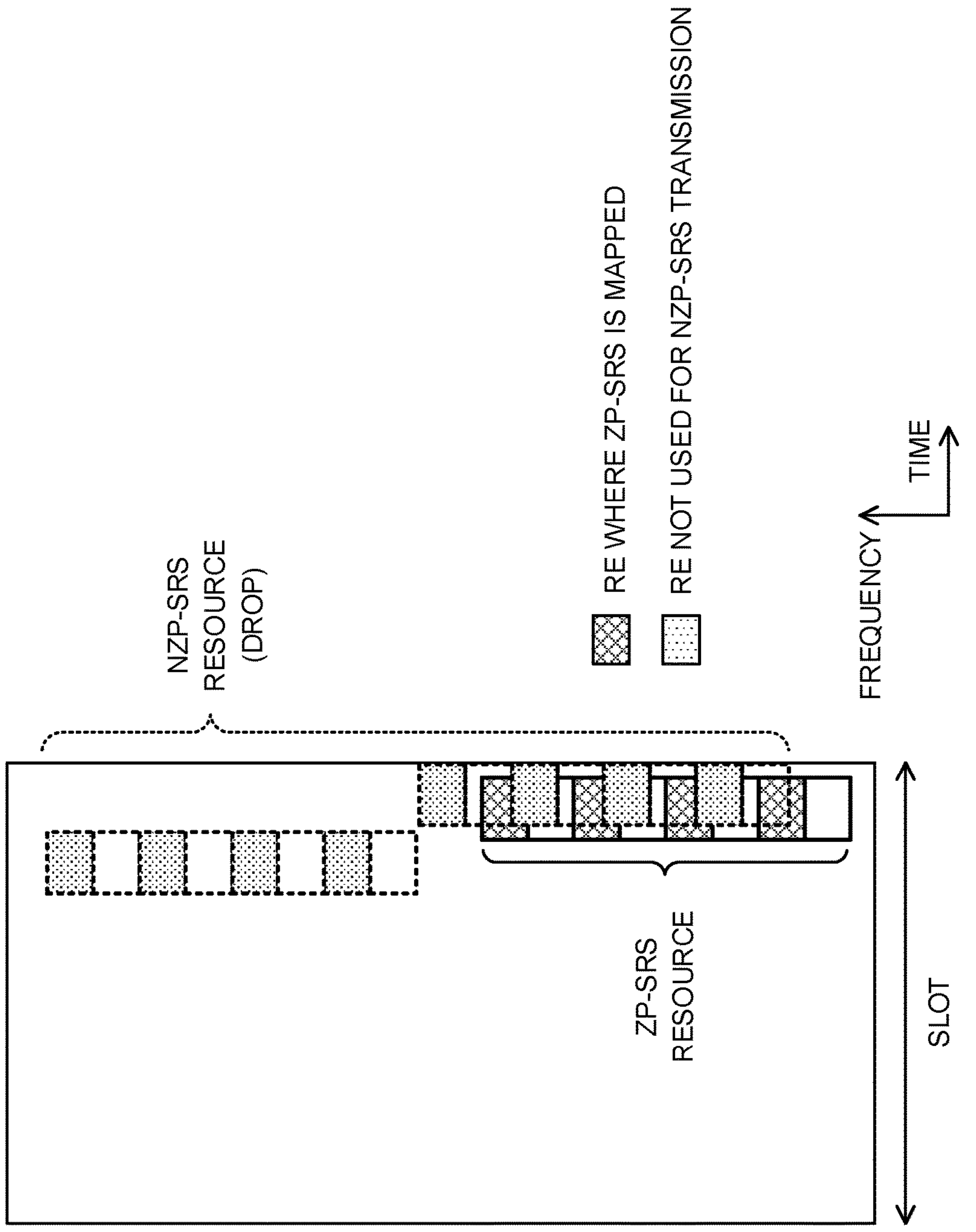
FIG. 21 is a diagram to show an example of the control method in a case that a resource for a ZP-SRS overlaps a resource for an NZP-SRS.

For example, as shown in FIG. 21, in the case that the ZP-SRS resource overlaps the NZP-SRS resource, the UE performs no transmission of the NZP-SRS in the slot (or drops the NZP-SRS).

In the case that the NZP-SRS is frequency-hopped, the NZP-SRS needs to be transmitted in a plurality of symbols. Therefore, if part of the symbols for the NZP-SRS over the plurality of symbols is not transmitted, a purpose of transmitting the NZP-SRS is not accomplished. In a case that different spatial relations are applied to a plurality of symbols in the multi-symbol SRS, the transmission of part of the NZP-SRS is likely to make no sense. In the case of using Embodiment 6-4, transmitting no NZP-SRS in the plurality of symbols can suppress power consumption of the UE.

Embodiment 7

The UE may expect to be configured with a ZP-SRS resource that includes a portion where a UL channel resource configured for the UE overlaps an SRS resource configured for another UE. The UE may expect that an SRS is transmitted from another UE in the portion where the UL channel resource configured for the UE overlaps the SRS resource configured for another UE. In a case that the UE is configured with a ZP-SRS resource, the UE may expect that at least part of a UL channel resource configured for the UE overlaps at least part of an SRS resource configured for another UE.

In a case that at least part of a UL channel resource for UE #1 overlaps at least part of an SRS resource for UE #2, a network (e.g., the base station) may configure a ZP-SRS resource for UE #1.

Figure 22:
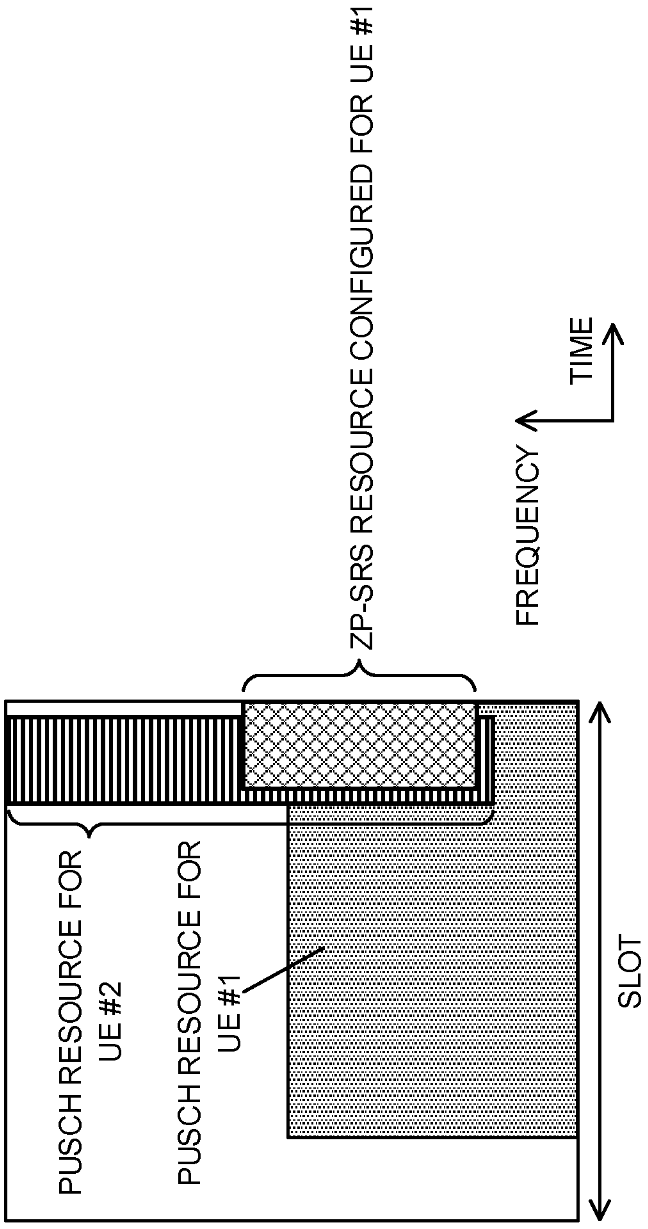
FIG. 22 is a diagram to show an example of a control method in a case that an uplink channel resource for a UE overlaps an SRS for another UE.

For example, as shown in FIG. 22, in a case that an SRS resource for UE #2 is configured in a PUSCH resource for UE #1 mapped in a slot, a ZP-SRS resource including an overlap portion is configured for UE #1.

In this case, the network may make notification to the UE of notification on the ZP-SRS configuration. The notification by the network may be made through higher layer signaling. The expectation like this allows the UL channel resource for the UE to be efficiently rate-matched in the SRS resource for another UE.

(Radio Communication System)

Hereinafter, a structure of a radio communication system according to one embodiment of the present disclosure will be described. In this radio communication system, any of the radio communication methods according to each embodiment of the present disclosure described above may be used alone or may be used in combination for communication.

Figure 23:
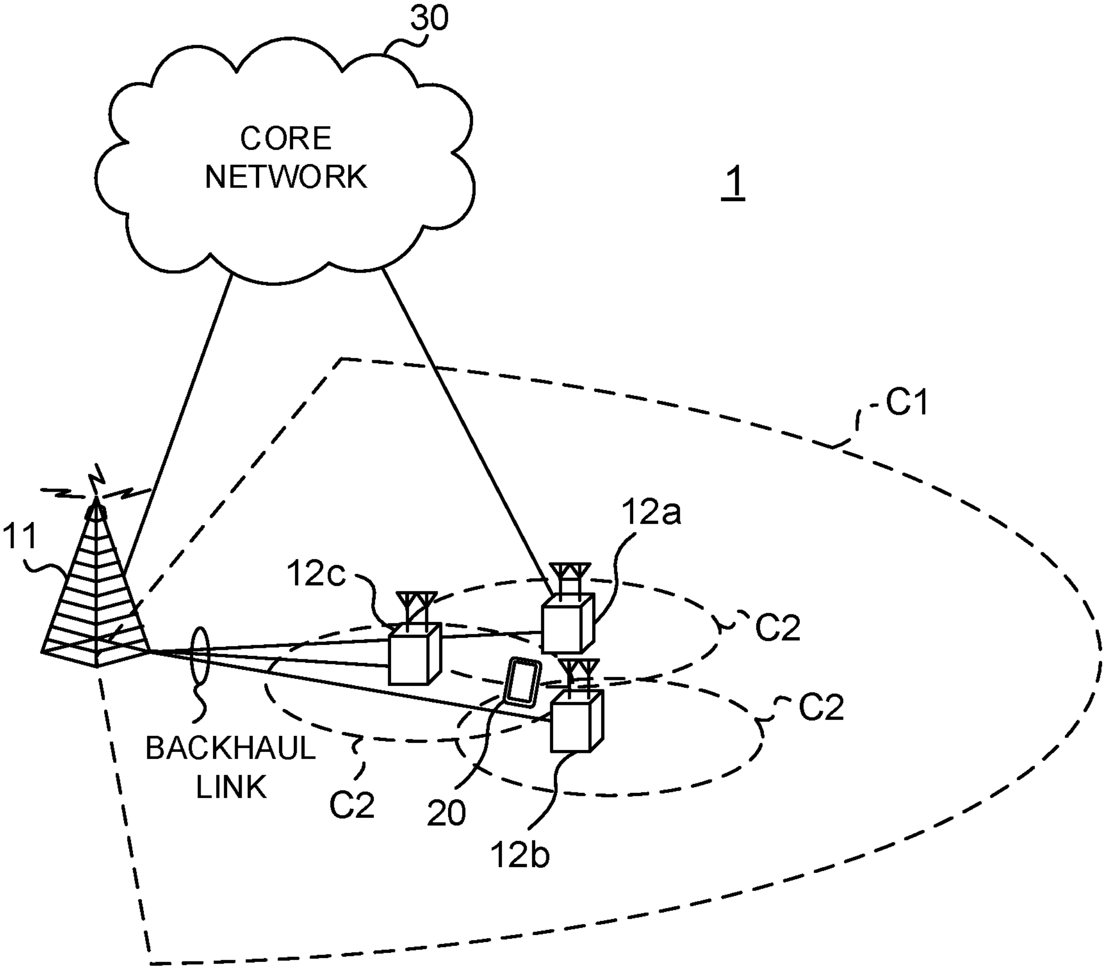
FIG. 23 is a diagram to show an example of a schematic structure of a radio communication system according to one embodiment.

FIG. 23 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), acknowledgment information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 24:
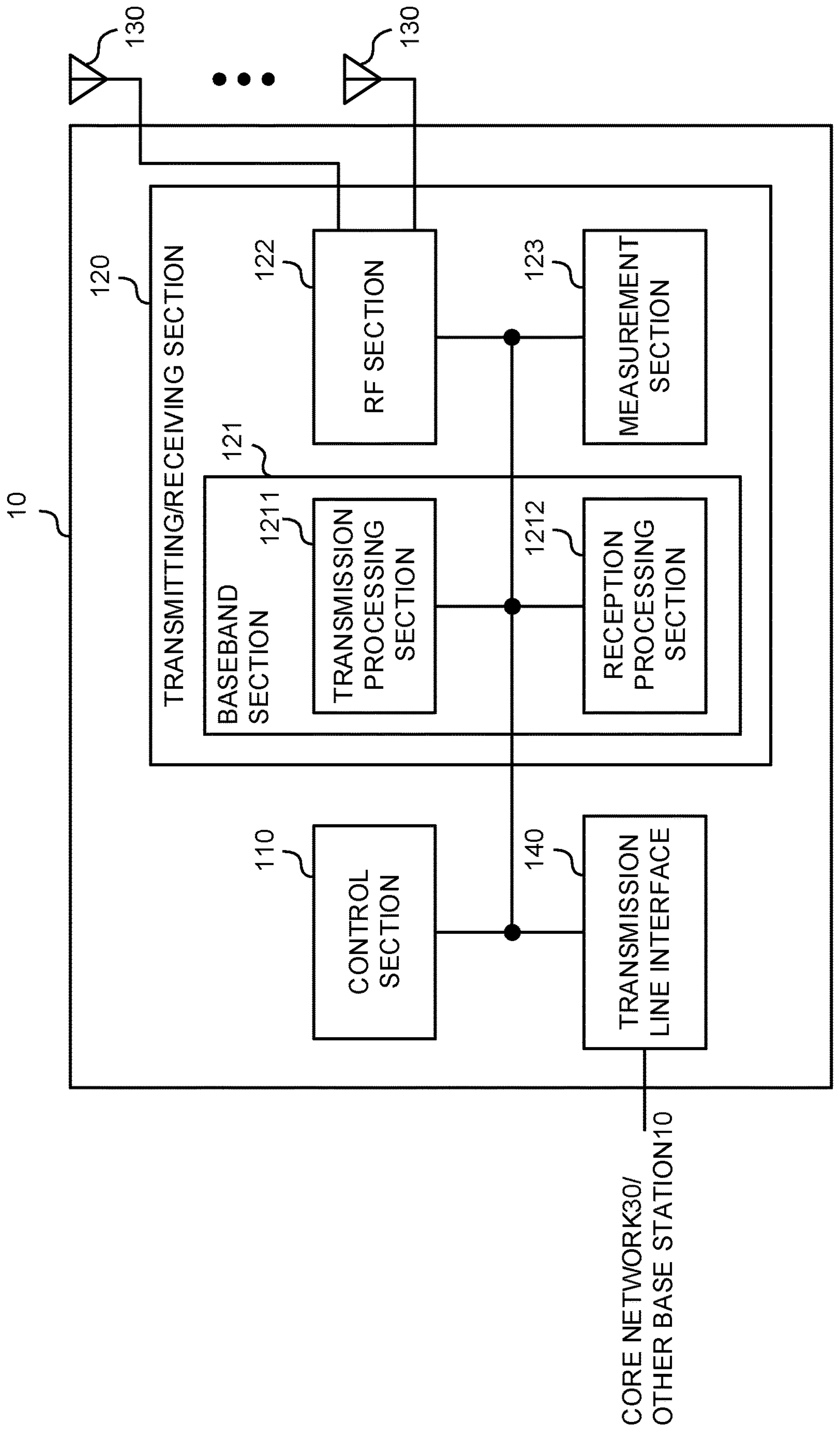
FIG. 24 is a diagram to show an example of a structure of a base station according to one embodiment.

FIG. 24 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can include a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may include a transmitting section and a receiving section. The transmitting section may include the transmission processing section 1211, and the RF section 122. The receiving section may include the reception processing section 1212, the RF section 122, and the measurement section 123.

The transmitting/receiving antennas 130 can include antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may include at least one of the transmitting/receiving section 120, the transmitting/receiving antennas 130, and the communication path interface 140.

(User Terminal)

Figure 25:
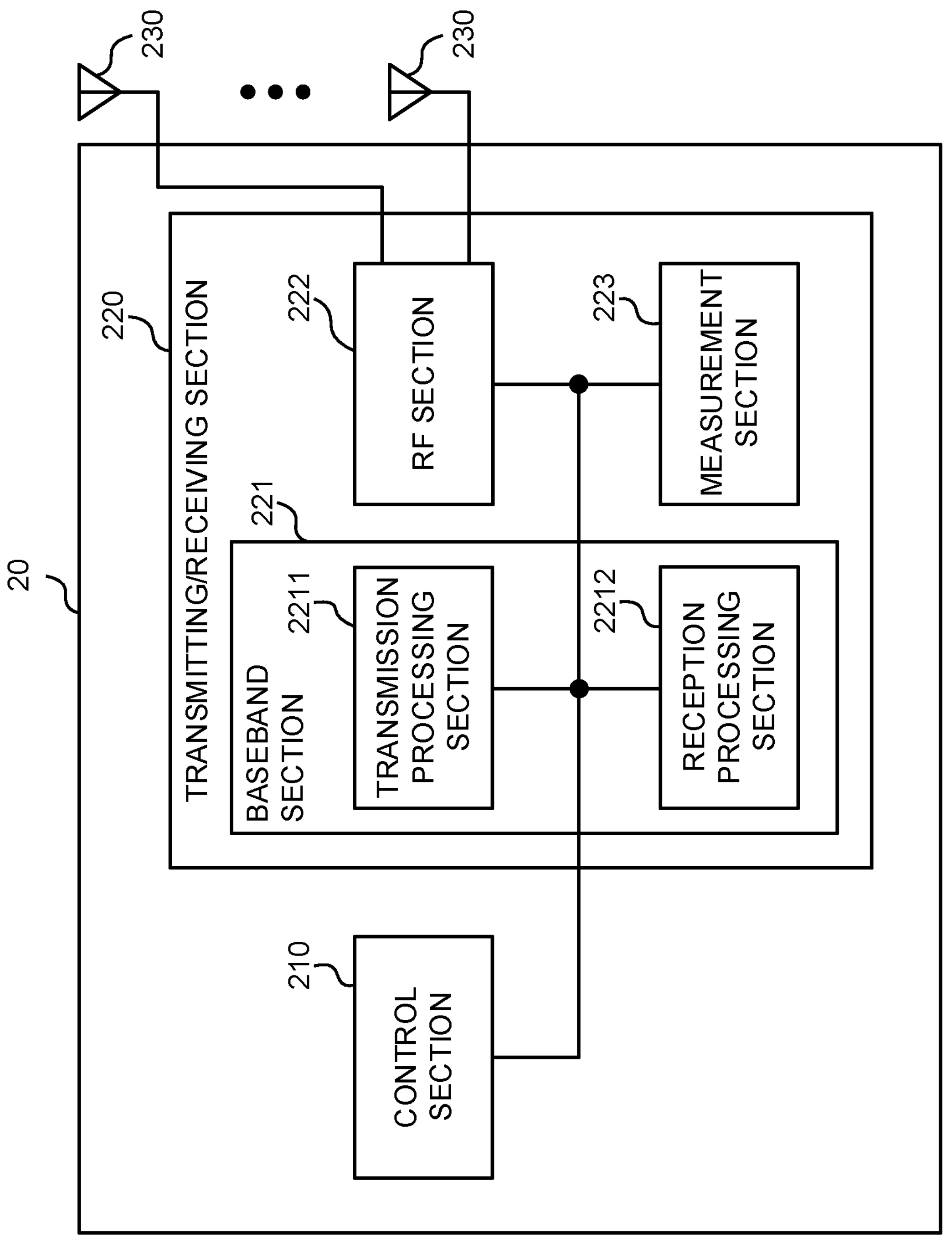
FIG. 25 is a diagram to show an example of a structure of a user terminal according to one embodiment.

FIG. 25 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can include a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may include a transmitting section and a receiving section. The transmitting section may include the transmission processing section 2211, and the RF section 222. The receiving section may include the reception processing section 2212, the RF section 222, and the measurement section 223.

The transmitting/receiving antennas 230 can include antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may include at least one of the transmitting/receiving section 220 and the transmitting/receiving antennas 230.

The transmitting/receiving section 220 may transmit at least one of a transmission of an uplink (UL) channel or a transmission of an SRS. The control section 210, in a case that a first resource provided for the uplink channel (e.g., UL channel resource) overlaps a second resource provided for the SRS (e.g., SRS resource), may reduce a resource to which at least one of the uplink channel and the SRS is mapped (may drop, rate-match, or puncture at least one of the uplink channel and the SRS).

The control section 210 may map the SRS to at least part of the second resource, and may map the uplink channel to the whole of the first resource (may drop or puncture the SRS and transmit the whole of the uplink channel) (Embodiment 1).

The control section 210 may not map the uplink channel to at least part of the first resource, and may map the SRS to the whole of the second resource (may drop, puncture or rate-match the uplink channel and transmit the whole of the SRS) (Embodiment 2).

In a case that the first resource overlaps the second resource, and a third resource for a retransmission of the uplink channel (e.g., UL channel resource) is provided, the control section 210 may map the retransmission to any one of a portion of the third resource not overlapping a resource (e.g., SRS resource) provided for another SRS (Embodiment 3-1), a fourth resource with an arrangement the same as that for an initial transmission of the uplink channel in the third resource (Embodiment 3-2), and a portion of the fourth resource not overlapping a resource provided for another SRS (Embodiment 3-3) (Embodiment 3).

The control section 210 may map, in each of a plurality of slots (e.g., a plurality of slots used for a multi-slot UL channel), the uplink channel for the slot to any one of an arrangement of a resource not overlapping a resource provided for an SRS, an arrangement the same as that for a resource not overlapping a resource provided for an SRS in an initial slot of the plurality of slots, and an arrangement of a resource not overlapping a resource provided for an SRS in any of the plurality of slots (Embodiment 4).

The transmitting/receiving section 220 may receive configuration information indicating the first resource for a zero power sounding reference signal (SRS) (e.g., ZP-SRS) (e.g., SRS configuration information, SRS resource set configuration information, SRS resource configuration information, ZP-SRS configuration information, ZP-SRS resource set configuration information, ZP-SRS resource configuration information, or the like) (Embodiment 5). In a case that a second resource provided for an uplink transmission overlaps the first resource, the control section 210 may not map the uplink transmission to at least part of the second resource (Embodiment 5).

The configuration information may indicate that a purpose (usage) of the first resource (e.g., the SRS resource set including the first resource) is the zero power (Embodiment 5).

The first resource may have a Comb structure (Embodiment 5).

The uplink transmission may be a physical uplink shared channel or a physical uplink control channel (Embodiment 5).

The uplink transmission may be an SRS with a non-zero power (e.g., NZP-SRS) (Embodiment 6).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 26:
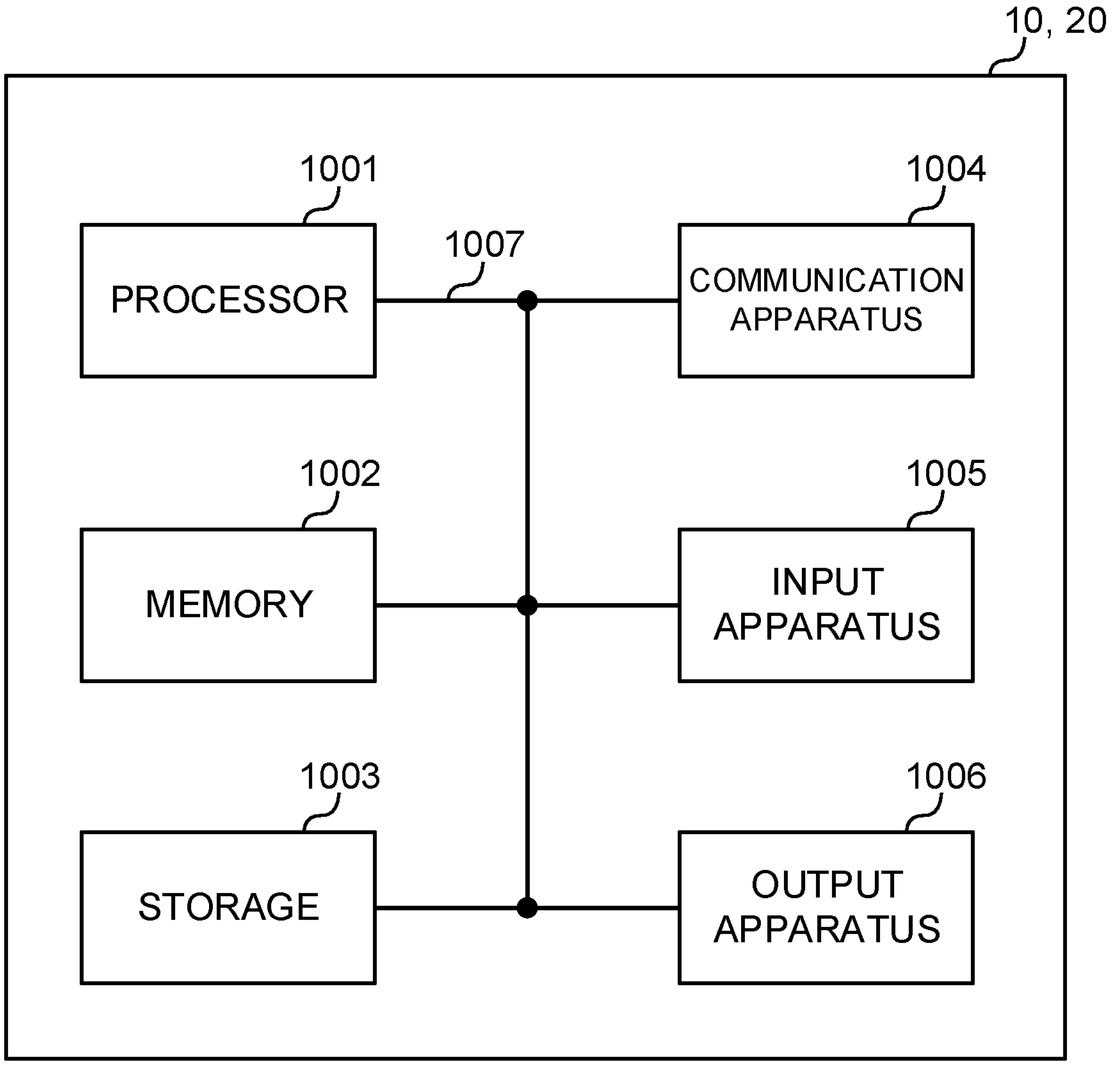
FIG. 26 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 26 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a “normal TTI” (TTI in 3GPP Rel. 8 to Rel. 12), a “long TTI,” a “normal subframe,” a “long subframe,” a “slot” and so on. A TTI that is shorter than a normal TTI may be referred to as a “shortened TTI,” a “short TTI,” a “partial or fractional TTI,” a “shortened subframe,” a “short subframe,” a “mini-slot,” a “sub-slot,” a “slot” and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a “physical resource block (Physical RB (PRB)),” a “sub-carrier group (SCG),” a “resource element group (REG),” a “PRB pair,” an “RB pair” and so on.

Furthermore, a resource block may be constituted of one or a plurality of resource elements (REs). For example, one RE may correspond to a radio resource field of one subcarrier and one symbol.

A bandwidth part (BWP) (which may be referred to as a “fractional bandwidth,” and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a “cell,” a “carrier,” and so on in the present disclosure may be interpreted as a “BWP”.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as “Layer 1/Layer 2 (L1/L2) control information (L1/L2 control signals),” “L1 control information (L1 control signal),” and so on. Also, RRC signaling may be referred to as an “RRC message,” and can be, for example, an RRC connection setup message, an RRC connection reconfiguration message, and so on. Also, MAC signaling may be reported using, for example, MAC control elements (MAC CEs).

Also, reporting of certain information (for example, reporting of “X holds”) does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as “software,” “firmware,” “middleware,” “microcode,” or “hardware description language,” or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements.

These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a processor that reduces a resource to which at least one of an uplink channel and a sounding reference signal (SRS) is mapped, in a case that a first resource provided for the uplink channel overlaps a second resource provided for the SRS; and a transmitter that performs at least one of a transmission of the uplink channel and a transmission of the SRS, wherein, in each of a plurality of slots, the uplink channel for the slot is mapped to any one of an arrangement of a resource not overlapping a resource provided for an SRS, an arrangement same as that for a resource not overlapping a resource provided for an SRS in an initial slot of the plurality of slots, and an arrangement of a resource not overlapping a resource provided for an SRS in any of the plurality of slots.

2. The terminal according to claim 1, wherein the processor does not map the uplink channel to at least part of the first resource, and maps the SRS to a whole of the second resource.

3. The terminal according to claim 1, wherein in a case that the first resource overlaps the second resource, and a third resource for a retransmission of the uplink channel is provided, the processor maps the retransmission to any one of a portion of the third resource not overlapping a resource provided for another SRS, a fourth resource with an arrangement same as that for an initial transmission of the uplink channel in the third resource, and a portion of the fourth resource not overlapping a resource provided for another SRS.

4. A radio communication method for a terminal, the radio communication method comprising:

reducing a resource to which at least one of an uplink channel and a sounding reference signal (SRS) is mapped, in a case that a first resource provided for the uplink channel overlaps a second resource provided for the SRS; and performing at least one of a transmission of the uplink channel and a transmission of the SRS, wherein, in each of a plurality of slots, the uplink channel for the slot is mapped to any one of an arrangement of a resource not overlapping a resource provided for an SRS, an arrangement same as that for a resource not overlapping a resource provided for an SRS in an initial slot of the plurality of slots, and an arrangement of a resource not overlapping a resource provided for an SRS in any of the plurality of slots.

5. The terminal according to claim 2, wherein in a case that the first resource overlaps the second resource, and a third resource for a retransmission of the uplink channel is provided, the processor maps the retransmission to any one of a portion of the third resource not overlapping a resource provided for another SRS, a fourth resource with an arrangement same as that for an initial transmission of the uplink channel in the third resource, and a portion of the fourth resource not overlapping a resource provided for another SRS.

6. A system comprising a terminal and a base station, wherein:

the terminal comprises:

a processor that reduces a resource to which at least one of an uplink channel and a sounding reference signal (SRS) is mapped, in a case that a first resource provided for the uplink channel overlaps a second resource provided for the SRS; and a transmitter that performs at least one of a transmission of the uplink channel and a transmission of the SRS, wherein, in each of a plurality of slots, the uplink channel for the slot is mapped to any one of an arrangement of a resource not overlapping a resource provided for an SRS, an arrangement same as that for a resource not overlapping a resource provided for an SRS in an initial slot of the plurality of slots, and an arrangement of a resource not overlapping a resource provided for an SRS in any of the plurality of slots, and the base station comprises:

a receiver that receives the uplink channel and receives the SRS.

* * * * *